(12) United States Patent
Tahara

(10) Patent No.: US 9,888,230 B2
(45) Date of Patent: Feb. 6, 2018

(54) VIDEO OBSERVATION SYSTEM

(71) Applicant: Hirofumi Tahara, Tokyo (JP)

(72) Inventor: Hirofumi Tahara, Tokyo (JP)

( * ) Notice: Subject to any disclaimer, the term of this patent is extended or adjusted under 35 U.S.C. 154(b) by 247 days.

(21) Appl. No.: 14/684,119

(22) Filed: Apr. 10, 2015

(65) Prior Publication Data

US 2015/0215608 A1 Jul. 30, 2015

Related U.S. Application Data

(63) Continuation-in-part of application No. PCT/JP2012/076313, filed on Oct. 11, 2012.

(51) Int. Cl.
*G03B 35/24* (2006.01)
*H04N 13/04* (2006.01)

(52) U.S. Cl.
CPC ......... *H04N 13/0402* (2013.01); *G03B 35/24* (2013.01); *H04N 13/044* (2013.01); *H04N 2213/001* (2013.01)

(58) Field of Classification Search
None
See application file for complete search history.

(56) References Cited

U.S. PATENT DOCUMENTS

| | | | | |
|---|---|---|---|---|
| 2009/0135493 A1* | 5/2009 | Takayanagi | ............... | B60R 1/12 359/631 |
| 2010/0007805 A1* | 1/2010 | Vitito | .................... | B60K 35/00 348/837 |
| 2010/0097580 A1* | 4/2010 | Yamamoto | ........... | G02B 26/101 353/69 |
| 2013/0093844 A1* | 4/2013 | Shuto | ................. | H04N 13/0029 348/43 |
| 2013/0339991 A1* | 12/2013 | Ricci | ................ | H04N 21/44204 725/14 |

FOREIGN PATENT DOCUMENTS

| JP | 2004-104742 A | | 4/2004 |
|---|---|---|---|
| JP | 2008-236888 A | | 10/2008 |
| JP | 2011-019028 A | | 1/2011 |
| JP | 2011-154144 A | | 8/2011 |
| JP | 2011154144 A | * | 8/2011 |
| JP | 2011-191384 A | | 9/2011 |
| JP | 2011191384 A | * | 9/2011 |
| JP | 2012-003374 A | | 1/2012 |
| JP | 2012-065327 A | | 3/2012 |
| JP | 2012-129776 A | | 7/2012 |
| JP | 2012-145787 A | | 8/2012 |

* cited by examiner

*Primary Examiner* — Eileen Adams
(74) *Attorney, Agent, or Firm* — Konomi Takeshita

(57) ABSTRACT

The present invention provides a video observation apparatus for observing video displayed on the display unit of an information processing terminal, comprising: a bottom portion on which the terminal is placed; a back sheet having a mirror portion on an inner surface of the back sheet opposing the terminal and arranged toward an observer to make an acute angle between the bottom portion and the back sheet; a top sheet arranged parallel to the bottom portion; and a front sheet having a lens portion positioned corresponding to the right and left eyes of the observer; wherein a height of the top sheet is offset downward from a height of the top of the apparatus formed by the back sheet; and wherein the apparatus is held by placing a thumb on the bottom portion, an index finger and/or a middle finger on the top sheet and the remaining fingers on the back sheet.

4 Claims, 29 Drawing Sheets

(a)

(b)

(a)

(b)

(b)

(c)

(a)

(b)

(c)

(a)

(b)

(c)

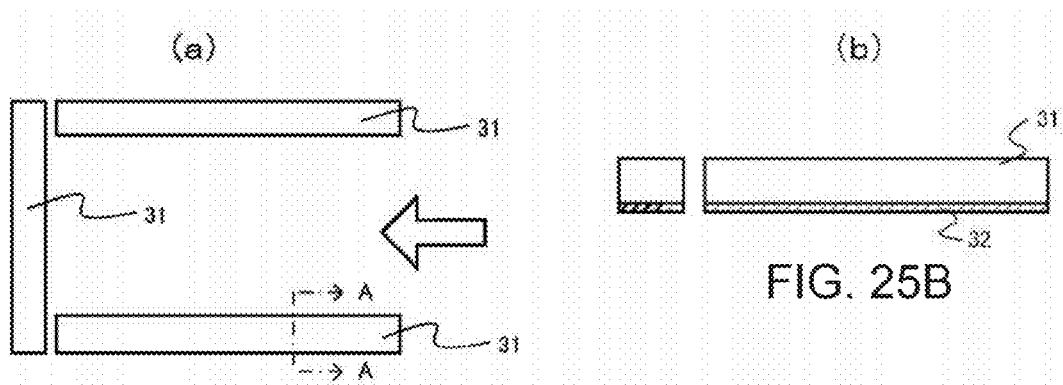
FIG. 25A
FIG. 25B
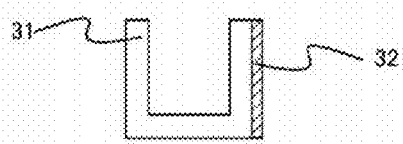
FIG. 25C
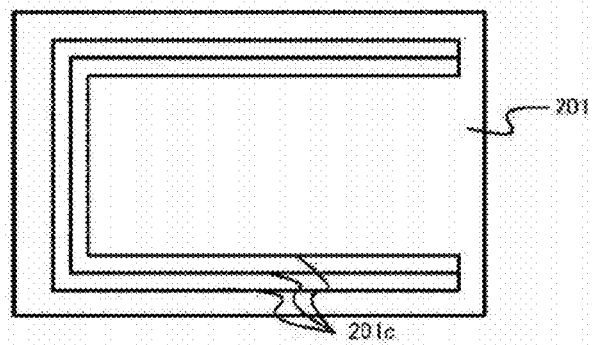
FIG. 26A
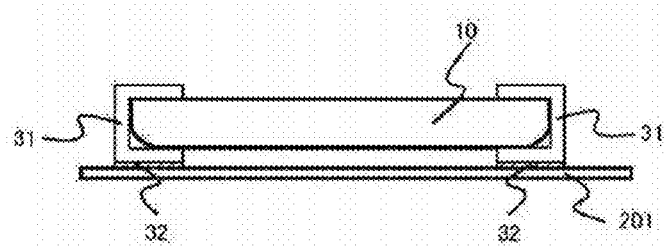
FIG. 26B (a)

(b)

Normal image

Left-eye image  Right-eye image

Left-eye image  Right-eye image

Left-eye image  Right-eye image

VIDEO OBSERVATION SYSTEM

CROSS REFERENCE TO RELATED APPLICATIONS

This application claims priority under 35 U.S.C. 365(c) and 35 U.S.C. 120 based upon International Patent Application Serial No. PCT/JP2012/076313, filed on Oct. 11, 2012. The entire disclosure of the aforesaid application is incorporated herein by reference.

FIELD OF THE INVENTION

The present invention pertains to a video observation apparatus for observing video displayed at the display unit of an information processing terminal.

BACKGROUND OF THE INVENTION

Technology is already known for achieving stereoscopic observing by separately providing a left-eye video and a right-eye video that are two-dimensional video with parallax to the left eye and right eye of a viewer. One example of a method for providing a left-eye video to just the left eye and a right-eye video to just the right eye is a shutter system which alternatingly displays the left-eye video and right-eye video, and opens and closes the left and right shutters of spectacles worn by the viewer, synchronized with the alternating display. Another example is a polarization system in which the left-eye video and the right-eye video are given different polarization orientations; the polarization filters of spectacles worn by the viewer allow only one image to pass. There are also systems which use a device equipped with an optical system that provides images independently to the left and right eyes of the viewer, such as a HMD (Head Mounted Display) (Patent Document 1, for example).

Movies, games, etc. and various types of stereoscopic video content are distributed using this sort of stereo video technology. Also, this sort of stereo video is used in training the extraocular muscles and kinetic vision, and in practice for vision recovery and visual performance.

RELATED ART DOCUMENTS

Patent Document 1: JP 2004-104742 A

Nevertheless, stereo video devices equipped with polarization filters, shutter control mechanisms, or optical systems like those described above are expensive devices, and have many components, so there is a problem in that the manufacturing cost is high. Also, a viewer observing this sort of stereo video content may experience so-called "visually induced motion sickness" with symptoms such as headache, nausea, dizziness, and blurred vision.

The cause of this visually induced motion sickness has not been explained, but it appears to lead to symptoms resembling the motion sickness resulting from the sensory difference between movement produced by vision and movement produced by other somatic sensations (for example, visually one seems to be moving but actually the body is not moving). This sort of visually induced motion sickness is likely to occur in young children of preschool age, who are still at the stage of developing their binocular vision function (the function wherein the brain fuses video obtained from the retinas of the left and right eyes and creates a single easy-to-view video) and in adults whose binocular vision function is not normal.

Therefore, in order to find out if visually induced motion sickness will occur in response to video content, it is necessary to observe stereo video in advance, or to perform an examination at a hospital, etc. Nevertheless, another problem is that stereo video devices are expensive, so it is not possible to casually view stereo video or perform an examination.

Accordingly, the present invention was created in view of the points mentioned above, and thus addresses the problem of providing a video observation system that makes it possible to observe stereo video content inexpensively and with a simple configuration, and that can expand the opportunities for observing stereo video.

SUMMARY OF THE INVENTION

As a means for solving the abovementioned problems, the present invention is provided with a video observation apparatus for observing video displayed on the display unit of an information processing terminal, comprising: a bottom portion on which the information processing terminal is placed; a back sheet linked to one end of the bottom portion, and having a mirror portion on an inner surface of the back sheet opposing the information processing terminal, and arranged toward an observer to make an acute angle between the bottom portion and the back sheet; a top sheet linked to the back sheet and arranged parallel to the bottom portion; and a front sheet linked to the top sheet and having a lens portion positioned corresponding to the right and left eyes of the observer; wherein a height of the top sheet linked to the back sheet is offset downward from a height of the top of the video observation apparatus formed by the back sheet; and wherein the video observation apparatus is held by placing a thumb on the bottom portion, an index finger and/or a middle finger on the top sheet and the remaining fingers on the back sheet.

According to the above mentioned invention, a linking portion between the top sheet and the back sheet is reinforced, and the shape thereof is not easily crushed when it is grasped. As a result, it is not necessary to select high-rigidity materials, the degree of freedom with regard to materials increases, and it is possible to reduce manufacturing costs.

Also, according to the above mentioned invention, a viewer who is observing the display image of an information processing terminal using this video observation apparatus holds the bottom portion with his or her thumbs, holds the top sheet with his or her index fingers and/or middle fingers, and can fit the remaining fingers to the slanted face of the back sheet and grip it. Therefore, gripping in an all-encompassing manner is possible, so stabilized gripping becomes possible, and the feeling of fatigue in the hands is reduced, and it is suitable for long-duration use, etc.

Further, according to the above mentioned invention, even in a situation in which the bottom portion is held with the thumbs, the top sheet is held with the index fingers and/or middle fingers, and the remaining fingers are fitted to the slanted face of the back sheet and the video observation apparatus is gripped in an all-encompassing manner, the gripping load is distributed to the front of the video observation apparatus where the index fingers and/or middle fingers are placed and the back of the video observation apparatus where the remaining fingers are placed, so the gripping load is dispersed over the entire video observation apparatus, and the shape thereof is not easily crushed. As a result, it is not necessary to select high-rigidity materials, the degree of freedom with regard to materials increases, and it is possible to reduce manufacturing costs.

In addition, according to the above mentioned invention, many people can display right-eye and left-eye video using their own information processing terminals, and otherwise there is a minimal configuration consisting of the lens unit and mirror unit, etc., so it becomes possible to simply and inexpensively observe stereo video without using expensive equipment such as polarization filters or lens shutter control mechanisms. It should also be noted that the arrangement "on which the information processing terminal is placed" in the invention includes systems such as placing the information processing terminal on the bottom portion or engaging or housing it there, as well as systems such as placing the bottom portion on the information processing terminal or engaging it, etc. Therefore, it is possible to manufacture and distribute many of the constituent members other than the information processing terminal, so it is possible to expand the opportunities for observing stereo video to many users, and it is possible to practice visual performance and to examine whether or not visually induced motion sickness will occur.

The aforementioned video observation apparatus may also be provided with a back sheet wall perpendicular to the back sheet and arranged at the portion in which the back sheet is linked with the top sheet; and wherein the top sheet is linked with the back sheet through the back sheet wall, thus the height of the top sheet linked to the back sheet is offset downward from the height of the top of the video observation apparatus formed by the back sheet.

According to the above mentioned invention, in the video observation apparatus in the present embodiment in an assembled state, the top sheet is linked with the back sheet through the back sheet wall, and the top sheet is offset downward from the top of the back sheet by about the height of the back sheet wall. Therefore, a linking portion between the top sheet and the back sheet is reinforced, and the shape thereof is not easily crushed when it is grasped. As a result, it is not necessary to select high-rigidity materials, the degree of freedom with regard to materials increases, and it is possible to reduce manufacturing costs.

The aforementioned video observation apparatus may also be provided with a pair of side sheets linked to the left and right sides of the back sheet and mainly supporting the back sheet on the bottom portion; wherein the front sheet mainly supports the top sheet on the bottom portion; and wherein the front and the top sheets and the back sheet are configured to be able to open and close independently of each other.

According to the above mentioned invention, it becomes easy to operate the information processing terminal by inserting or removing the information processing terminal temporarily, or by touching the display screen.

In the aforementioned invention, the bottom portion and all the said sheets may be configured as one piece and the said linking portions may be configured to be able to fold such that all the sheets are stored in the bottom portion.

According to the above mentioned invention, the video observation apparatus is very small in size when folded up, and is easy to carry around.

Also, an another invention is also provided with an information processing apparatus for displaying left-eye video and right-eye video created by generating a parallax therebetween on a display thereof, the display being observed through a video observation apparatus with at least lens portions corresponding to a right and left eye, comprising: an application execution unit for executing a program for displaying said videos; and a pupil distance input unit for acquiring information pertaining to a distance between the left-pupil and the right-pupil of an observer and generating video distance information between the left-eye video and the right-eye video; and wherein the program changes a distance between the left-eye video and the right-eye video based upon the video distance information.

According to the above-mentioned invention, it is possible to place the left and right images at positions corresponding to the inter-pupil distance of the viewer, so the images can be observed with the left/right separation that is optimal for the viewer, the degree of independence between the images is further increased, and it is possible to observe an even higher-quality three-dimensional image. Also, since the degree of independence between the left and right images is increased in this manner, features such as a partition plate for preventing crosstalk between the left and right images inside the device are not required. Therefore, it is possible to make the device be small, and it is possible to reduce manufacturing costs.

The aforementioned information processing apparatus may also be provided with a model information acquisition unit for inputting information pertaining to a type of the information processing terminal to the application execution unit; and wherein said program changes a size, position, and aspect ratio of video displayed at said display unit on the basis of information pertaining to the type inputted from said model information acquisition unit, and changes a position of reference marks that indicate the reference position of said video.

According to the above-mentioned invention, the size, position, and aspect ratio of the video displayed at the display unit are changed in accordance with the model of the information processing terminal, and the position of the reference marks that indicate the reference position of the video are changed, so it becomes possible to set the arrangement in accordance with information processing terminals made by different manufacturers and having different standard sizes. As a result, it becomes possible to observe stereo video with many types of information processing terminals, and it is possible to expand the opportunities for observing stereo video to many users.

In the aforementioned invention, said program may display stereo video created by generating a convergence angle and parallax between the left-eye video and right-eye video corresponding to the left and right eyes of the viewer as said video, and may change the convergence angle and parallax of said stereo video, and thereby guides a focal point with respect to the eyes of said observer so as to approach toward or recede from said viewer.

According to the above-mentioned invention, the program displays stereo by changing the convergence angle and parallax of the stereo video, so when the viewer observes video from the lens unit, the right-eye focal point matches only the right-eye image and the left-eye focal point matches only the left-eye image, and excellent stereo video can be observed.

The aforementioned information processing apparatus may also be provided with a speech recognition unit that recognizes speech and inputs a recognition result to said application execution unit; and wherein said program changes the image on the basis of said recognition result inputted from said speech recognition unit.

According to the above-mentioned invention, the user's speech can be recognized, so practice for visual recovery or kinetic vision can be performed easily without having to operate keys.

Further, an another invention is also provided with a video observation apparatus for observing an information processing apparatus for displaying left-eye video and right-eye video created by generating a parallax therebetween on a display thereof, the display being observed through a video observation apparatus with at least a lens portion each corresponding to a right and a left eye, comprising: the information processing apparatus, including: an application execution unit for executing a program for displaying said videos; and a pupil distance input unit for acquiring information pertaining to a distance between the left-pupil and the right-pupil of an observer and generating video distance information between the left-eye video and the right-eye video; and wherein the program changes a distance between the left-eye video and the right-eye video based upon the video distance information, and the video observation apparatus, including: a bottom portion on which the information processing terminal is placed; a back sheet linked to one end of the bottom portion, and having a mirror portion at an inner surface of the back sheet opposite the information processing terminal, and arranged toward an observer to make an acute angle between the bottom portion and the back sheet; a top sheet linked to the back sheet and arranged parallel to the bottom portion; and a front sheet linked to the top sheet and having lens portions positioned corresponding to the right and left eyes of the observer; and wherein the mirror portion is arranged on an inner portion of the back sheet so as to cover areas in which the left-eye video and the right-eye video are displayed.

According to the above mentioned invention, it is possible to place the left and right images at positions corresponding to the inter-pupil distance of the viewer, so the images can be observed with the left/right separation that is optimal for the viewer, the degree of independence between the images is further increased, and it is possible to observe an even higher-quality three-dimensional image. Also, many people can display right-eye and left-eye video using their own information processing terminals, and otherwise there is a minimal configuration consisting of the lens unit and mirror unit, etc., so it becomes possible to simply and inexpensively observe stereo video without using expensive equipment such as polarization filters or lens shutter control mechanisms.

As discussed above, as a result of the present invention, when stereoscopically observing video displayed at the display unit of an information processing terminal such as a smart phone, portable phone, or tablet PC, the manufacturing cost can be made very cheap due to a simple configuration that uses inexpensive members such as paper or fabric, and it becomes possible to watch stereo video content and to expand the opportunities for observing stereo video.

Other features and advantages of the present invention will become apparent from the following detailed description, taken in conjunction with the accompanying drawings, which illustrates, by way of example, the principle of the invention.

BRIEF DESCRIPTION OF THE DRAWINGS

FIG. 25A: An upper plain view showing a holding unit in accordance with a modification FIG. 25B: A side view showing a holding unit FIG. 25C: A cross-section of FIG. 25A at A-A.

FIG. 26A: An upper plain view showing the stage unit, with the holding unit glued thereto, in accordance with a modification FIG. 26B: An explanatory diagram of the side face showing an information processing terminal held by the holding unit.

DETAILED DESCRIPTION OF THE INVENTION

Next, embodiments of a stereo video display device that is a 3-D viewer in accordance with the present invention shall be explained in detail with reference to drawings.

First Embodiment

Figure 1:
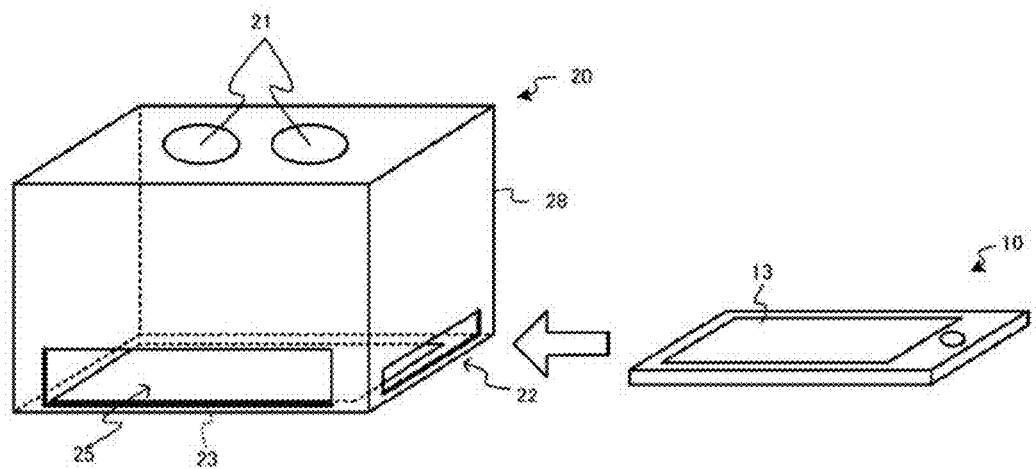
FIG. 1: An oblique view showing the overall configuration of a stereo video display device in accordance with the first embodiment.
Figure 2:
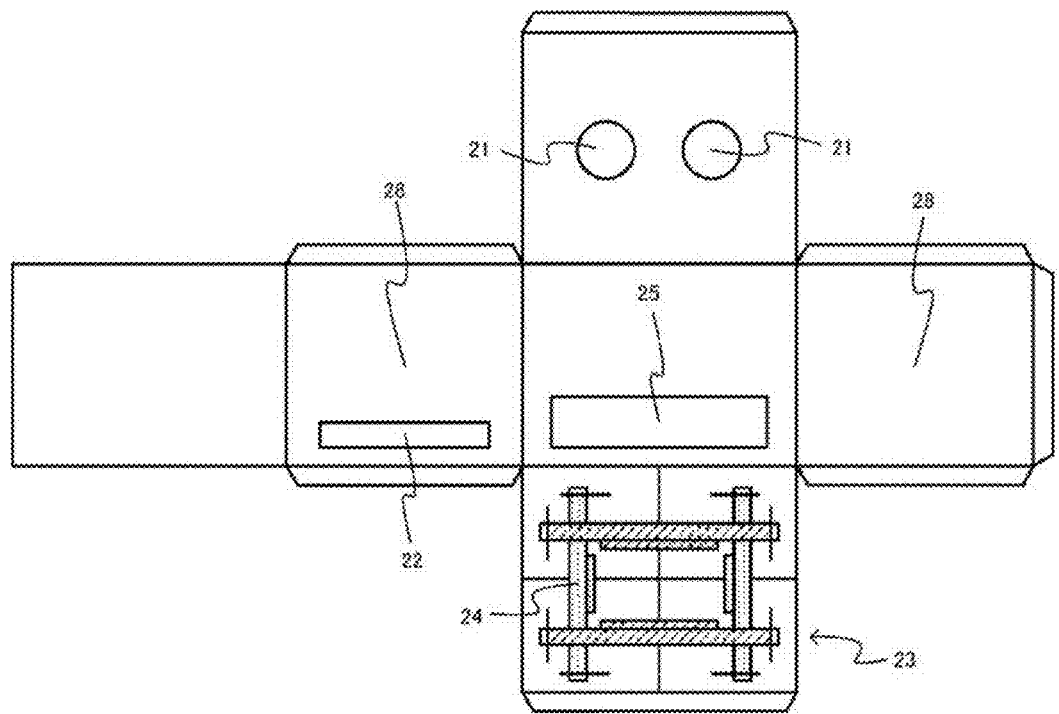
FIG. 2: An exploded view of a casing in accordance with the first embodiment.
Figure 3:
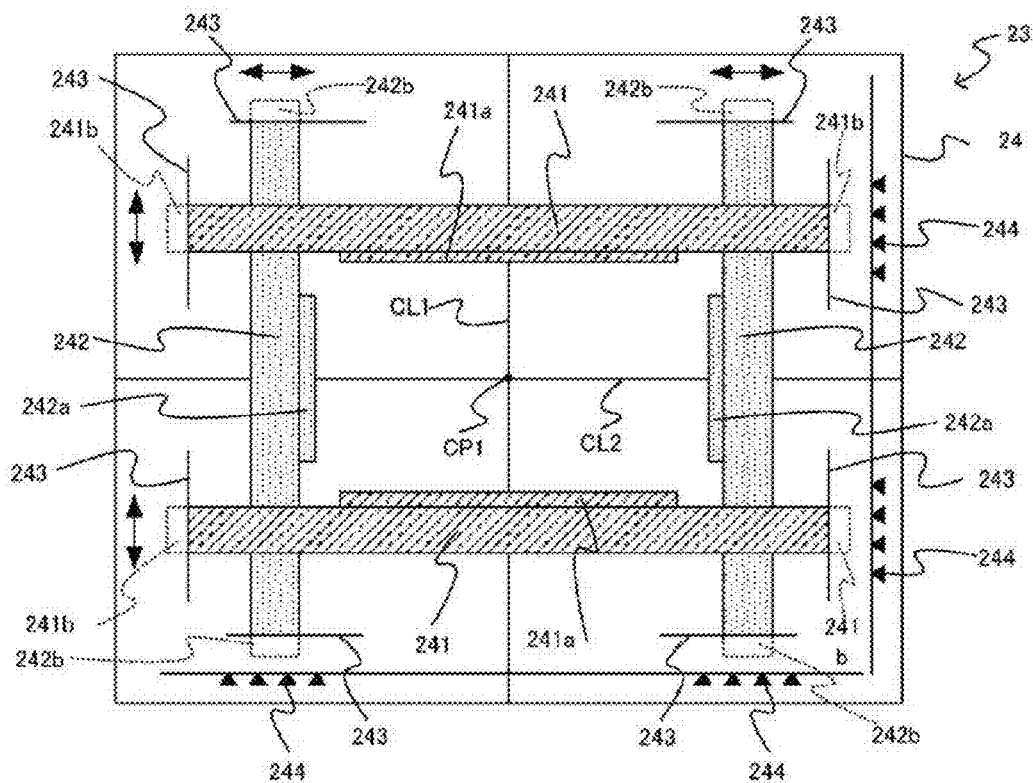
FIG. 3: A plan view showing a stage unit in accordance with the first embodiment.
Figure 4:
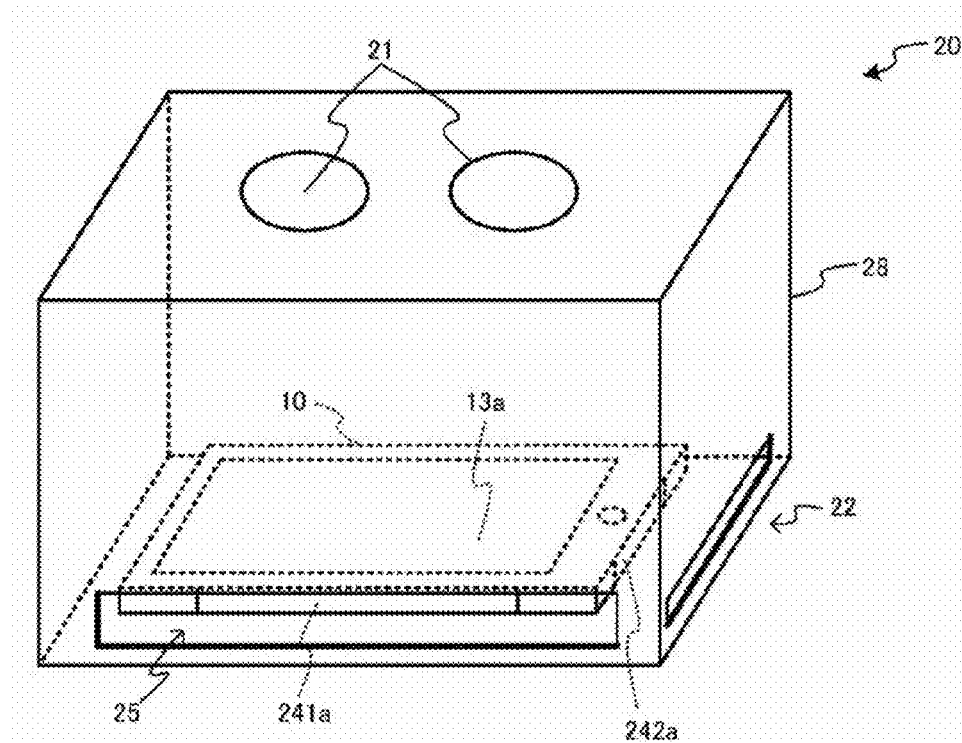
FIG. 4: An oblique view showing an information processing terminal disposed inside the casing in accordance with the first embodiment.

FIG. 1 is an oblique view showing the overall configuration of a stereo video display device in accordance with a first embodiment, FIG. 2 is an exploded view of a casing in accordance with the first embodiment, FIG. 3 is a plan view showing a stage unit in accordance with the first embodiment, and FIG. 4 is an oblique view showing an information processing terminal 10 disposed inside the casing in accordance with the first embodiment.

As shown in FIG. 1, a video observation system in accordance with the present invention is a system for viewing video displayed at the display unit 13a of the information processing terminal 10, and consists of an essentially rectangular oblong casing 20 and the information processing terminal 10.

The casing 20 is formed from a material such as paper or plastic. As shown in FIG. 1, a pair of lens units 21 and 21 are disposed on the upper face sheet at positions corresponding to the left and right eyes, and a stage unit 23 on which the information processing terminal 10 is placed is provided at the lower face sheet that is opposite the upper sheet where the pair of lens units 21 and 21 are provided. Also, a linking unit 28 is provided to fix the positional relationship of the stage unit 23 and the lens units 21 and 21. The pair of lens units 21 are convex eyepiece lenses that enlarge the real image created at the focal point. It should be noted that the lens shape is not limited; for example, it is also possible to use a sheetlike Fresnel lens which has a serrated cross-section and reduces the thickness by dividing an ordinary convex lens into concentric annular regions.

Also, side face sheets which link the upper face sheet and the lower face sheet of the casing 20 form the linking part 28. The length-direction distance of the linking part 28 is a predetermined length so that stereo video can be seen well when the viewer observes video from the pair of lens units 21 and 21. The side face sheets, upper face sheet, and lower face sheet are formed in an integrated manner by cutting from a single sheet of paper, as shown in FIG. 2; bending produces the essentially rectangular oblong casing shown in FIG. 1.

In addition, a holding unit 24 is formed on the surface of the stage unit 23 (at the inside face when assembled) for positioning the information processing terminal 10. As shown in FIG. 3, the holding unit 24 has a pair of vertical fixing units 241 and 241, and a pair of side fixing units 242 and 242.

The vertical fixing units 241 and the pair of side fixing units 242 respectively have both-end portions 241b and 242b which are inserted into slits 243 formed in the lower face sheet that serves as the stage unit 23, and can slide the length of the slits 243.

Also, the pair of vertical fixing units 241 and 241 and the pair of side fixing units 242 and 242 have stoppers 241a and 242a that can be bent toward the inside of the casing at the outside edge of the sheet. As shown in FIG. 4, the stoppers 241a and 242a are bent and touch the side faces of the information processing terminal 10 when the information processing terminal 10 is disposed on the stage 23, thereby preventing the information processing terminal 10 from being out of position.

Also, reference markings are made on the stage unit 23 for matching the video position displayed at the display unit 13a. Specifically, as shown in FIG. 3, center lines CL1 and CL2, extending in the vertical direction and the left/right direction and passing through the center point CP1 of the stage unit 23 sheet are drawn. By matching the center lines displayed at the display unit 13a is possible to match the information processing terminal 10 to the appropriate video position. Also, marks 244 are made at positions where the outer edge portion of the information processing terminal 10 is positioned when the information processing terminal 10 is placed on the stage unit 23. A plurality of these marks 244 are made, on the basis of the sizes of the information processing terminals 10 of each company.

Also, an opening 22 is provided in the casing 20 in the side face sheet that forms the linking part 28 near the stage unit 23 to allow the information processing terminal 10 to be accommodated in the interior thereof. It should be noted that this opening 22 may be covered by a lid member so that external light does not enter the interior when the information processing terminal 10 is accommodated in the interior thereof. In addition, the casing 20 is provided with an operation hole 25 in the side face sheet for operating the information processing terminal 10 when observing stereo video. It should be noted that it is possible to configure matters so that the information processing terminal 10 is inserted through and removed from the operation hole 25, and the opening 22 is omitted. It should be noted that in the drawings the pair of lens units 21 and 21 are disposed at the top, but during use, for example, the viewer lifts the casing 20 and tilts the casing 20 to the extent that the information processing terminal does not fall out and observes stereo video.

Figure 7:
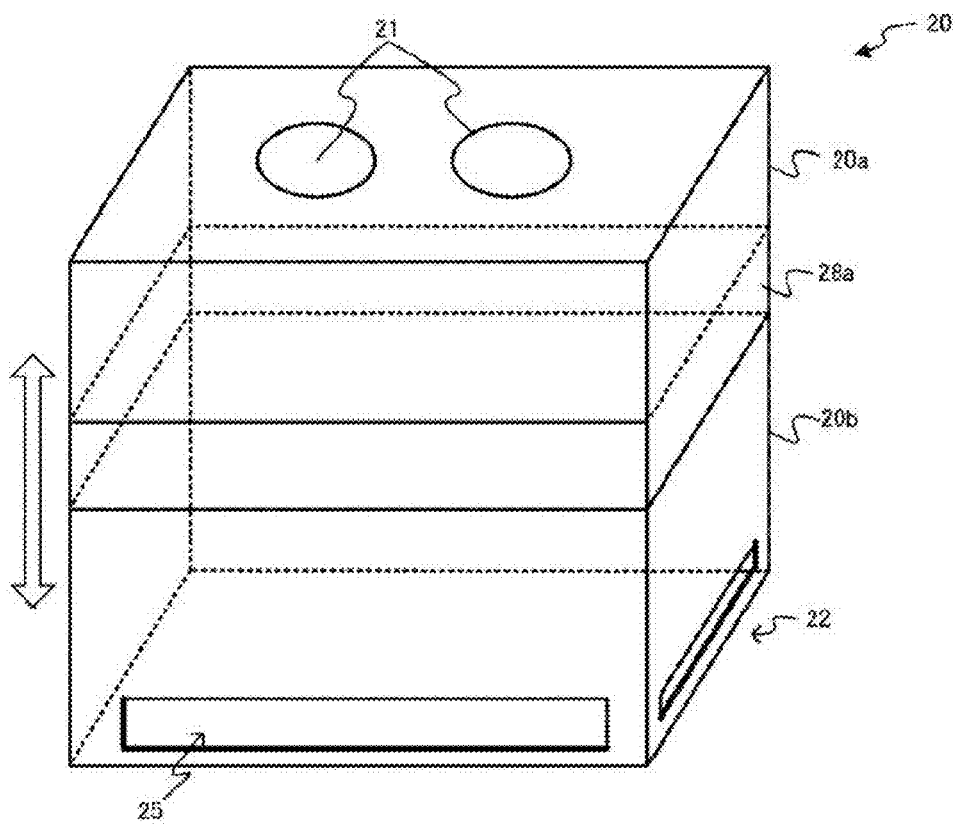
FIG. 7: An oblique diagram showing the length adjustment mechanism of the casing in accordance with the first embodiment.

In addition, in this embodiment the linking unit 28 is formed using side face sheets that are integrated, but as shown in FIG. 7, for example, it is also possible to cut the side face sheets, and form a slideable linking part 28a such that a casing 20a where the pair of lens units 21 and 21 are formed and a casing 20b where the stage unit 23 is formed are separated. In this case, it is possible to freely set different focal positions according to the viewer or the information processing terminals 10 of different manufacturers, so it is possible to observe even better stereo video.

Meanwhile, the information processing terminal (10) is a portable telephone utilizing wireless communication; the portable telephone communicates wirelessly with a relay point such as a base station, and can receive communication services such as voice or data communication while moving. Examples of the communication system of this portable telephone include FDMA, TDMA, CDMA, W-CDMA, as well as PHS (Personal Handyphone System). The portable telephone also has a digital camera function, the function of executing application software, position information acquisition functions such as GPS (Global Positioning System), and functions as a portable information terminal (PDA).

Internal Structure of the Information Processing Terminal 10

Figure 5:
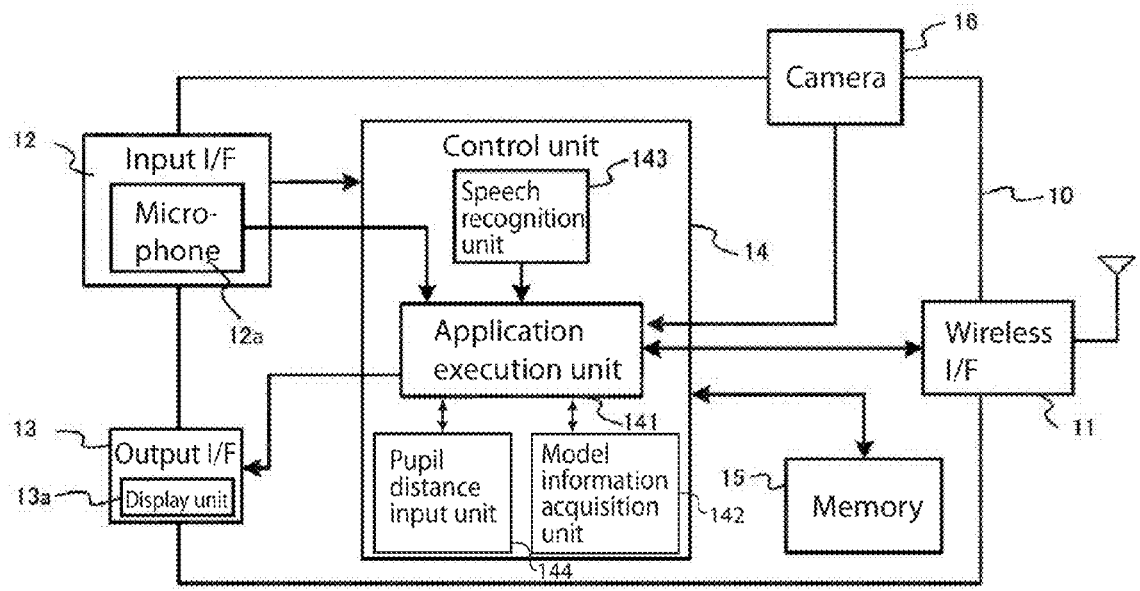
FIG. 5: A block diagram showing the internal structure of the information processing terminal.
Figure 6A:
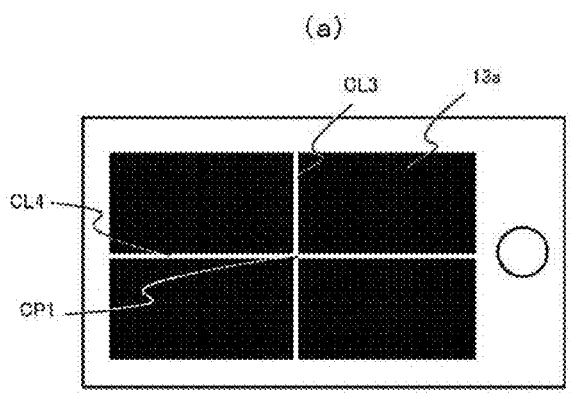
FIG. 6A: An explanatory diagram for explaining the centerlines for position adjustment that are displayed on the screen in accordance with the first embodiment.
Figure 6B:
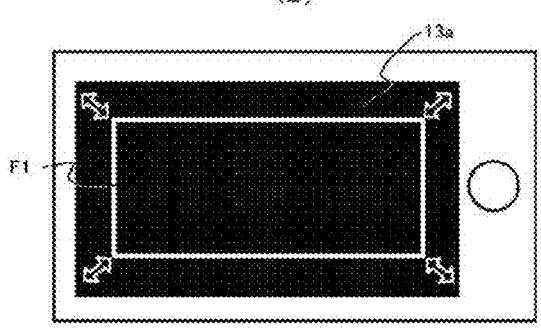
FIG. 6B: An explanatory diagram showing the frame for adjusting the stereo video display range in accordance with the first embodiment.

Next, the internal structure of the information processing terminal 10 shall be described. FIG. 5 is a block diagram showing the internal structure of an information processing terminal in accordance with this embodiment. FIG. 6A is an explanatory diagram for explaining the centerlines for position adjustment that are displayed on a screen in accordance with the first embodiment, and FIG. 6B is an explanatory diagram showing the frame for adjusting the stereo video display range. It should be noted that the "module" used in this description consists of hardware such as a device or equipment, or software that has those functions, or a combination thereof, and indicates a functional unit for achieving a predetermined action.

As shown in FIG. 5, the information processing terminal 10 is equipped with an input interface 12 and an output interface 13 as modules for the user interface system. The input interface 12 is a device for inputting user operations, such as operation buttons or a touch panel or a jog dial. Also, the input interface 12 is equipped with a microphone 12a for acquiring speech.

The output interface 13 is a device for outputting video or audio, such as a display or speaker. In particular, the output interface 13 includes a display unit 13a such as a liquid crystal display; stereo video, etc. corresponding to various types of programs executed by an application execution unit 141 are displayed at the display unit 13a.

Also, the information processing terminal 10 is provided with a control unit 14 and a memory 15 as functional modules for displaying the stereo video of the present invention. The memory 15 is a storage device which stores the OS (Operating System), stereo video content related to this embodiment, various programs for measuring visual acuity, and programs for various types of applications that are installed in the terminal and device ID information (ID) for the terminal, etc.

The control unit 14 is a computation module consisting of hardware such as a processor such as a CPU or DSP (Digital Signal Processor), memory, and other electronic circuits, software such as programs that have those functions, or a combination thereof. Various types of functional modules can be virtually constructed by appropriately reading and executing programs. It is a module which uses the various constructed functional modules to perform processing related to image data, control the actions of each unit, and perform various types of processing in response to user operations.

In this embodiment the control unit 14 is provided with the application execution unit 141, a model information acquisition unit 142, and a speech recognition unit 143. A model information acquisition unit 17 is a module which inputs information pertaining to the type of the information processing terminal 10 to the application execution unit 141. The speech recognition unit 18 is a module which recognizes speech and inputs the recognition result to the application execution unit. Speech data from the microphone 12a provided in the terminal is acquired, and analyzed using speech recognition processing; audio characteristics are extracted from the speech data and the content thereof is interpreted.

In this embodiment, when a program related to visual performance is executed, as a general principle the viewer's operations are received by means of speech. Nevertheless, it is also possible to configure matters so that operations on a touch panel are received, or to connect an operation device such as a mouse or keyboard using a separate cable and receive the viewer's operations on the basis of that operation device.

The application execution unit 141 is a module which executes applications such as ordinary OS or browser software, media viewing applications, etc. Normally this is performed by the CPU, etc. In this embodiment, the application execution unit 141 is a module which executes various types of programs related to visual performance (visual performance measurement programs, visual performance training programs, etc.), displays the stereo video content stored in the memory 15 at the display unit 13a, and performs computational processing such as visual acuity measurement.

When various types of programs pertaining to the present invention are executed, the application execution unit 141 and displays stereo video created by generating a convergence angle and parallax between left-eye video and right-eye video corresponding to the left and right eyes of the viewer on the screen as video, and changes the convergence angle and parallax of the stereo video, and guides the focal point with respect to the eyes of the observer so as to approach toward or recede from the viewer. Thus only the focal point of the right-eye video matches the right eye, and only the focal point of the left-eye video matches the left eye, and excellent stereo video can be observed.

Figure 28A:
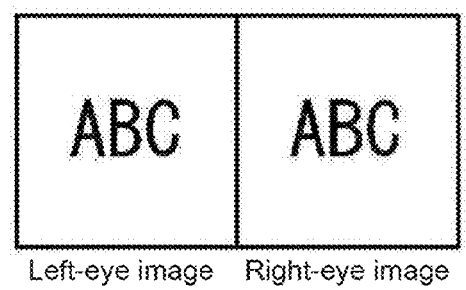
FIG. 28A: An explanatory diagram showing a display arrangement for stereo video displayed at the display unit in accordance with an embodiment.
Figure 28B:
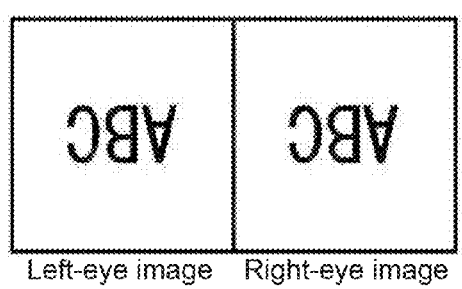
FIG. 28B: An explanatory diagram showing a display arrangement for stereo video displayed at the display unit in accordance with an embodiment.
Figure 28C:
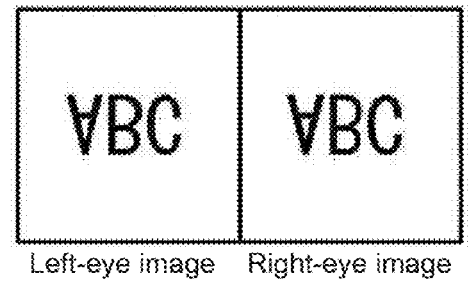
FIG. 28C: An explanatory diagram showing a display arrangement for stereo video displayed at the display unit in accordance with an embodiment.

Now, the image displayed at the display unit 13a is arranged so that the display of the video changes in accordance with the positional relationship of the display unit 13a that is displaying the video and the pair of lens units 21 and 21. Specifically, as shown in FIG. 1, when the display unit 13a and the lens units 21 are configured to face one another, the image is displayed without rotation or inversion as shown in FIG. 28A, but as will be described later, if the display unit 13a and the lens units 21 do not face each other and the viewer looks at the video using a mirror, first, as shown in FIG. 28B, the image is inverted vertically, and then, as shown in FIG. 28C, the right-eye image and the left-eye image are separated and inverted in the left/right direction.

Figure 35A:
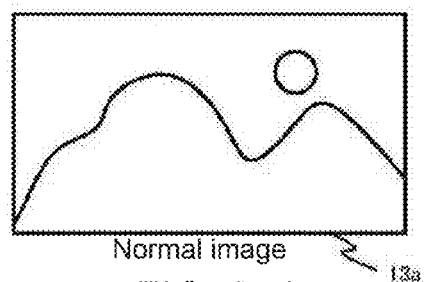
FIG. 35A: An explanatory diagram showing display arrangements for stereo video displayed at the display unit in accordance with an embodiment.
Figure 35B:
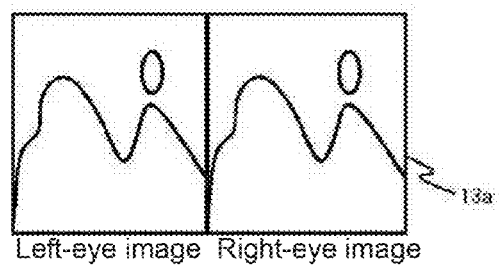
FIG. 35B: An explanatory diagram showing display arrangements for stereo video displayed at the display unit in accordance with an embodiment.

It should also be noted, as shown in FIG. 35A, that a normal image is displayed as a single image on the display unit 13a, but if a side-by-side type of stereo image is displayed at the display unit 13a, two frames consisting of one frame of right-eye video signal and one frame of left-eye video signal are each compressed to one-half in the horizontal direction, and they are aligned laterally and displayed as a single frame, as shown in FIG. 35B, creating a vertically-distorted image. If this sort of image is viewed through the lens unit 21, correct stereo video cannot be observed.

Figure 35C:
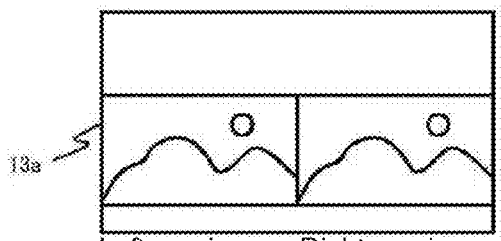
FIG. 35C: An explanatory diagram showing display arrangements for stereo video displayed at the display unit in accordance with an embodiment.
Figure 35D:
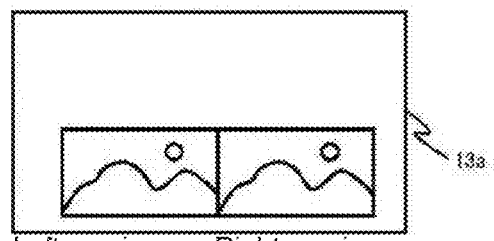
FIG. 35D: An explanatory diagram showing display arrangements for stereo video displayed at the display unit in accordance with an embodiment.

Therefore, when displaying the right-eye image and the left-eye image at the display unit 13a, the application execution unit 141 performs compression so as to maintain the vertical/horizontal size ratio of the images, and displays the images at the display unit 13a. Specifically, the height of the two frame images as shown in FIG. 35B is compressed as shown in FIG. 35C so as to create the same aspect ratio of a normal single-frame image. When doing so, the stereo video is moved vertically on the screen in accordance with the lens unit 21. Also, as shown in FIG. 35D, it is possible to additionally compress the right-eye image and the left-eye image, depending on the type of information processing terminal. In this case too the aspect ratio of the respective images is maintained while they are compressed, and the stereo video is shifted to a predetermined position on the screen in accordance with the lens unit 21. It should be noted that details of the various program shall be described later.

It should be noted that the application execution unit 141, before displaying stereo video, modifies the size, position, and aspect ratio of the video that is displayed at the display unit 13a on the basis of information pertaining to type that was inputted from the model information acquisition unit 17, and changes the position of the reference marks indicating the reference position of the video. Specifically, a position adjustment program has been stored in the memory 15; when the application execution unit 141 executes the position adjustment program, a lateral-direction center line CL4 which passes through the center CP1 of the screen and a vertical-direction center line CL3 which passes through the center CP1 of the screen are displayed as shown in FIG. 6A. When the information processing terminal 10 is disposed in the casing 20, the information processing terminal 10 can be disposed at the appropriate position by positioning it so that these center lines CL3 and CL4 overlap the center lines CL1 and CL2 that were made on the stage unit 23.

Also, a program for expanding or contracting the display range of stereo video is stored in the memory 15. When a display range change operation is performed by user operation, the application execution unit 141 displays an outer frame F1 as shown in FIG. 6B. This outer frame F1 is expanded or contracted in accordance with operations from the input interface 12, and the display range is changed.

In addition, the information processing terminal 10 is provided with a communication interface 11 as a communication interface module. The communication interface 11 is a communication interface for performing data communication; it has functions such as non-contact communication using wireless means, and contact (wired) communication using cables, adapters, etc. A camera 16 is a photography device which photographs still images or moving images. It consists of a lens and a solid-state imaging element such as a CCD or CMOS; incoming light representing a subject image is focused on the light-receiving face of a CCD, and image data is generated via the camera's signal processing circuit and an A/D converter, etc.

Various Programs

Next, the various programs executed by the above-mentioned application execution unit 141 shall be described.

(1) Visual Acuity Recovery Programs

Figure 10:
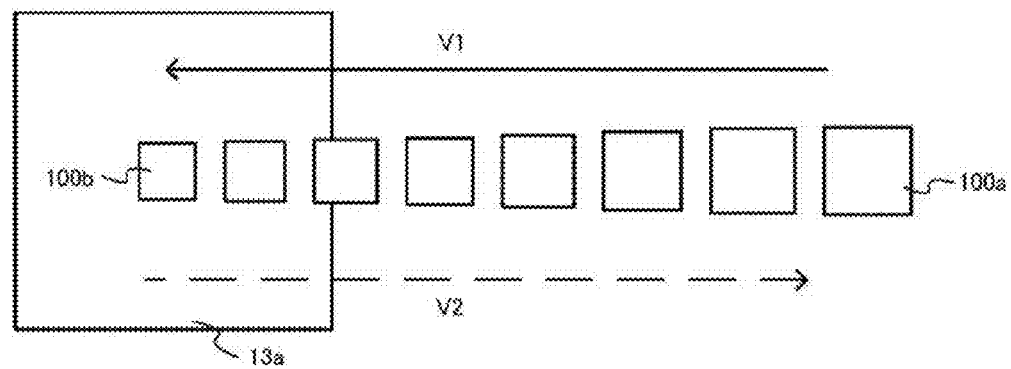
FIG. 10: A diagram for explaining the case when the visual acuity recovery method in accordance with the first embodiment is stereo perspective video.
Figure 11:
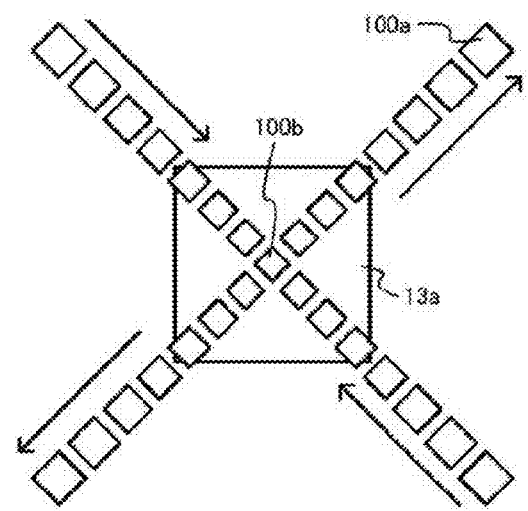
FIG. 11: A diagram for explaining the case when the visual acuity recovery method in accordance with the first embodiment is directional perspective training.
Figure 12:
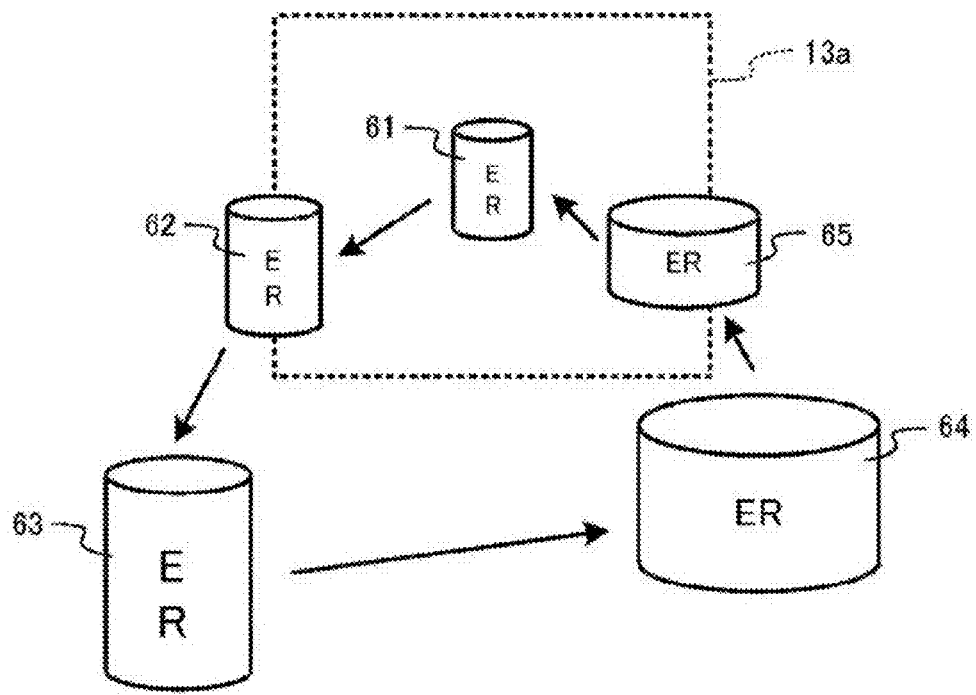
FIG. 12: A diagram showing an example of movement of an advertising stereo image in accordance with the first embodiment.

First, visual acuity recovery programs executed by the application execution unit 141 shall be described. FIG. 10 is a diagram for explaining the case when the visual acuity recovery method in accordance with this embodiment is stereo perspective video. FIG. 11 is a diagram for explaining the case when the visual acuity recovery method in accordance with this embodiment is directional perspective training.

When a player operates the terminal 10, the visual acuity recovery program is read from the memory 15 by the application execution unit 141. The player immediately and automatically becomes a viewer or trainee. The menu has choices such as stereo perspective video and stereo directional video. If stereo perspective video is selected, FIG. 10 (schematic display) is displayed at the display unit 13a, and if stereo directional video is selected, FIG. 11 (schematic display) is alternatively displayed.

In the case of stereo perspective video, in FIG. 10, stereo video 100a is displayed at the display unit 13a at a position (the image appears at the display unit 13a) near the lens unit 21, and then is displayed successively farther away from the lens unit 21. Ultimately, after the passage of a predetermined time, the distant stereo video 100b is displayed. A viewer peering into the lens units 21 and 21 performs autonomic eye focal point adjustment in order to clearly view the stereo video 100b.

If the stereo video 100a is a letter, the trainee strives to read the letter. At this time the ciliary body and the extraocular muscles automatically activate, adjust the thickness of the lenticular capsule, and cause the image of the letter to be accurately focused on the retina. In order to read the letter, the ciliary body and the extraocular muscles become active in order to put the focal point on the retina. In the case of stereo perspective video, the trainee can input in advance the separation velocity V1 and movement range distance L of the stereo video 100a and can input speech instructions during training. For example, the movement range distance L is set as 10 m and the separation velocity V1=10 m/6 sec and the approach velocity V2=10 m/12 sec, etc. These are inputted based on the input interface 12.

Other shapes can be selected for the stereo video 100a, for example, a fish, a cat, a heart-shaped, a star, a circle, a triangle, a square, or some other stereo character. It is also possible to freely set the respective sizes of these stereo videos 100a, make them be red, blue, yellow, purple, orange, pink, and select various types of colored patterns from a list. Speech data from the memory 15 is processed and then sent to the speaker. During training, one can also select various types of audio from a list: a reading of poems by Touson Shimazaki, classical music, popular songs, pop music, jazz, folk songs, the sound of the wind or the sound of waves, etc.

The number of seconds in the time for dividing the movement distance of the stereo video can be set large or small, thereby adjusting the speed at which the stereo video 100a recedes. A young myopic trainee has difficulty seeing distant things, so making the separation velocity V1 fast (setting a small number of seconds for the time) increases the exercise force of the ciliary body and extraocular muscles, etc. A young myopic trainee sees near things well, so making the approach velocity V2 slow (setting a large number of seconds for the time) relaxes the exercise force of the ciliary body and extraocular muscles, etc.

On the other hand, a far-sighted elderly trainee sees distant things well, so making the separation velocity V1 slow (setting a large number of seconds for the time) relaxes the exercise force of the ciliary body and extraocular muscles, etc. A farsighted elderly trainee has difficulty seeing near things, so making the approach velocity V2 fast (setting a small number of seconds for the time) increases the exercise force of the ciliary body and extraocular muscles, etc. The training is executed three or four minutes at a time: before starting desk work at a PC, etc., during breaks during the day, and at the end of the day. In a method that resembles a directional perspective training method, as shown in FIG. 11, the stereo video 100a approaches until it is extremely close to the left eye at the upper left, and then becomes successively more distant toward the depth direction in the center of the screen.

It is possible to configure matters so that the receding velocity and the approaching velocity of stereo video can be set to an appropriate numerical value from the input interface 12. The trainee tracks the stereo video 100a using both eyes. While doing so the face is oriented forward, and the stereo video 100a—a letter, for example—is viewed (the focal point is adjusted) by moving both eyeballs. Tracking is performed by both eyes, so the ciliary body and extraocular muscles, etc. of both eyes work actively, or try to work by elongating and contracting.

Next, the stereo video 100b approaches by moving from the depth-direction center toward the right eye in the upper right direction. Actually, stereo video is displayed on the screen, but both eyes of the trainee must focus on a virtual image in order to view stereo video, so in both eyes the ciliary body and extraocular muscles, etc. operate as they would when an actual physical body is receding or approaching. In addition, the stereo video approaches until it is extremely close to the right eye at the upper right, and then becomes successively more distant toward the depth direction in the center of the screen.

Also, the stereo video 100b comes close by successively moving from the depth-direction center toward the right eye in the lower right direction. In the same manner, the stereo video approaches until it is extremely close to the left eye at the lower left, and then becomes successively more distant toward the depth direction in the center of the screen. Various combinations of these approaching/receding positions and velocities and movement sequences can be appropriately set in advance from the input interface 12 in accordance with the visual acuity of the trainee.

In this method too it is also possible to use the input interface 12 to freely set the respective sizes of the stereo video 100a, make it be red, blue, yellow, purple, orange, pink, and select various types of colored patterns from a list. During training, one can also select various types of audio from a list: a reading of poems, classical music, popular songs, pop music, jazz, folk songs, the sound of the wind or the sound of waves, etc.

(2) Advertising Video Display Program

Next, an advertising video display program executed by the application execution unit 141 shall be described. This advertising video display program is configured to show a panel on which advertising text for a product, etc. is written or to show a stereo video advertising the product itself. The advertising video display program is stored in the memory 15, played as the result of an instruction from the application execution unit 141, and a left-eye video and a right-eye video are displayed on the screen of the stereo video display device. Here, the menu may have two types of display, for example: if advertising stereo perspective video is selected, FIG. 10 (schematic display) is displayed, and if advertising stereo directional video is selected, FIG. 11 (schematic display) is alternatively displayed at the display unit 13a.

Figure 19:
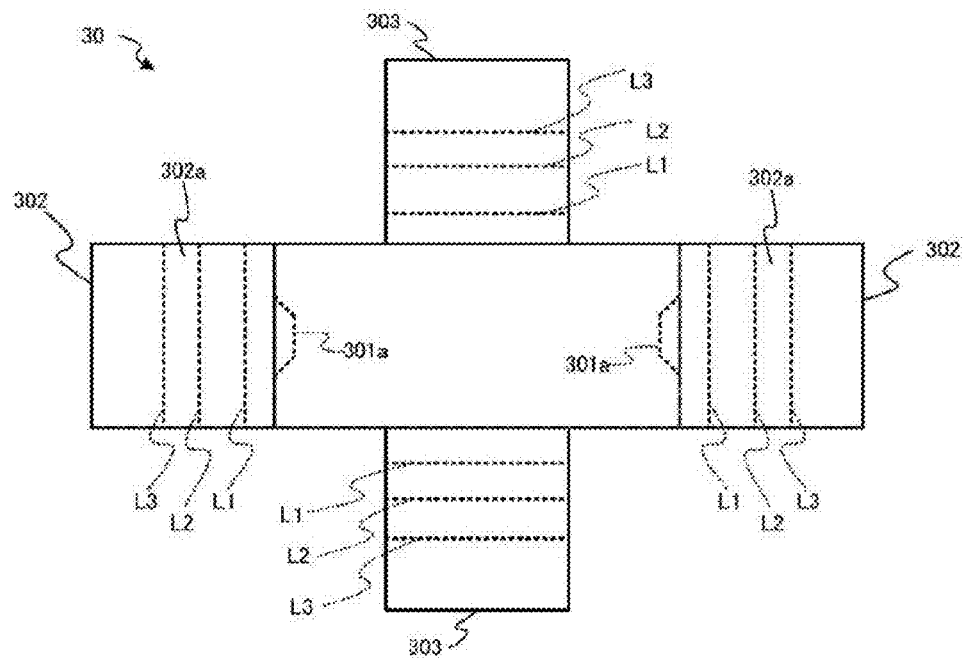
FIG. 19: An exploded view of a holding unit in accordance with the third embodiment.

For convenience, text on a rectangular panel is used in the following discussion, but advertising stereo perspective video may be advertising text drawn on a stereo (three-dimensional) product as shown in FIG. 19, or in the case of a vehicle may be video of the vehicle body itself. Now, in the case of advertising stereo perspective video, in FIG. 10 the advertising stereo video 100a is displayed on the display unit 13a at a position (the image appears at the display unit 13a) near the viewer, and then is displayed successively receding from the viewer. Ultimately, after the passage of a predetermined time, the advertising stereo video 100b is displayed at a distance.

A large advertising stereo image 63 that leaps forward is displayed, and then moves to the right and becomes advertising stereo video 64. Advertising stereo video 65 is small and moves successively into the display unit 13a, becoming distant from the viewer, and ultimately becomes the smallest advertising stereo video 61. Next, at the left side of the screen, the large advertising stereo video 62, somewhat closer to the viewer, is displayed leaping forward from the display unit 13a. Autonomic eye focal point adjustment is performed so that the user can clearly view the distant advertising stereo video 100b (61). At the same time, in the advertising stereo perspective video in FIG. 19, the canned beverage "ER" product can reliably penetrate into the trainee's mind.

When striving to read the letters "ER," the ciliary body and the extraocular muscles automatically activate, adjust the thickness of the lenticular capsule, and cause the image of the letters to be accurately focused on the retina. In order to read the letters, the ciliary body and the extraocular muscles work to put the focal point on the retina. In the case of stereo perspective video, the trainee can input in advance the separation velocity V1 and movement range distance L of the advertising stereo video 100a (61-65) and can input speech instructions during training. For example, the movement range distance L is set as 10 m and the separation velocity V1=10 m/6 sec and the approach velocity V2=10 m/12 sec, etc. These are inputted from the input interface 12.

A fish, a cat, a heart-shaped, a star, a circle, a triangle, a square, or some other stereo character corresponding to a product or service can be selected. It is also possible to freely set the respective sizes of these advertising stereo videos 100a (61-65), make them be red, blue, yellow, purple, orange, pink, and select various types of colored patterns. Relaxing music data from the memory 15 is processed and then sent to the speaker. For the music during training, after copyright approval, classics of traditional Japanese music by Michio Miyage, classical music by Mozart or Bach, gentle folk songs, soothing wind sounds, the sound of waves, etc. can be selected from a list.

Also, when adjusting the velocity at which the advertising stereo video 100a (61-65) recedes, in FIG. 10 making the separation velocity V1 fast increases the exercise force of the ciliary body and extraocular muscles, etc. Conversely, making the approach velocity V2 slow relaxes the exercise force of the ciliary body and extraocular muscles, etc. In addition, making the separation velocity V1 slow relaxes the exercise force of the ciliary body and extraocular muscles, etc. And it should be noted that making the approach velocity V2 fast increases the exercise force of the ciliary body and extraocular muscles, etc.

The training is executed three or four minutes at a time. In a method that resembles a directional perspective training method, as shown in FIG. 10 and FIG. 11, the stereo video 100a (61-65) approaches until it is extremely close to the left eye at the upper left, and then becomes successively more distant toward the depth direction in the center of the screen. A corporate CM (advertising) and basic training to strengthen visual acuity can be carried out simultaneously. Tracking an advertising stereo video with the eyes increases the effect of the viewer remembering the advertising stereo video. If using a PC at one's daily workplace, eye training is experienced in a relaxed psychological state at a familiar place, so the ability to focus on the advertising stereo video is heightened even more.

The trainee tracks the advertising stereo video 100a (61-65) using both eyes. While doing so the face is oriented forward, and the advertising stereo video 100a (61-65)—letters, for example—are viewed (ER is read) by moving both eyeballs. Tracking is performed by both eyes, so the ciliary body and extraocular muscles, etc. of both eyes work actively, or try to work by elongating and contracting. Next, the advertising stereo video 100b (61-65) approaches by moving from the depth-direction center toward the right eye in the upper right direction. Actually, advertising stereo video is displayed on the screen, but both eyes of the trainee must focus on a virtual image in order to view advertising stereo video, so in both eyes the ciliary body and extraocular muscles, etc. operate as they would when an actual physical body is receding or approaching.

The video becomes distant moving toward the screen center in the depth direction. Also, next, the advertising stereo video 100b (61-65) comes close by successively moving from the depth-direction center toward the right eye in the lower right direction. In the same manner, the advertising stereo video now approaches until it is extremely close to the left eye at the lower left, and then becomes successively more distant toward the depth direction in the center of the screen. Repeatedly and continuously performing this sort of training improves the visual acuity of the trainee (viewer), so the movement velocity and path of the corresponding advertising stereo video are appropriately modified. In addition, the advertising stereo video software itself is modified so that different videos can be displayed.

It is possible to configure matters so that the receding velocity and the approaching velocity of advertising stereo video can be set to an appropriate numerical value. Various types of setting can be performed, according to the individual's current visual acuity. Also, if necessary, various types of personal data can be collected, such as the viewer's sex, age, physical condition, interests, status of recovering visual acuity, and frequency of training. Customized training is possible with personal data.

When doing this, the company that requests the advertising pays a monthly advertising fee to the system operating company. And the operating company pays a fixed amount every month to the company at the video advertising location as a fee for providing the advertising location. Expenses occur when the company at the video advertising location introduces the set of visual acuity recovery equipment, but the advertising stereo video is used as visual acuity recovery software, so the fee for providing the video advertising location becomes income, the initial cost is recovered, and the road to continued additional income thereafter is opened.

The visual acuity recovery program can be used over and over, by anyone, in an office or home or while commuting on a train. Even people who want to do visual acuity recovery but are overworked and people who procrastinate about visual acuity recovery training can reliably continue to do training, and if the video advertising location is provided to individuals, income can be obtained. Nowadays, when looking at an electronic display device is a part of work, myopia and tired eyes and astigmatism are likely to occur. Conversely, however, it is possible to give electronic devices the function of displaying advertising stereo video, so it is possible to mandatorily and automatically pursue visual acuity recovery during working hours, and viewing advertising creates the opportunity for additional income.

(3) Binocular Vision Examination Program

Figure 13:
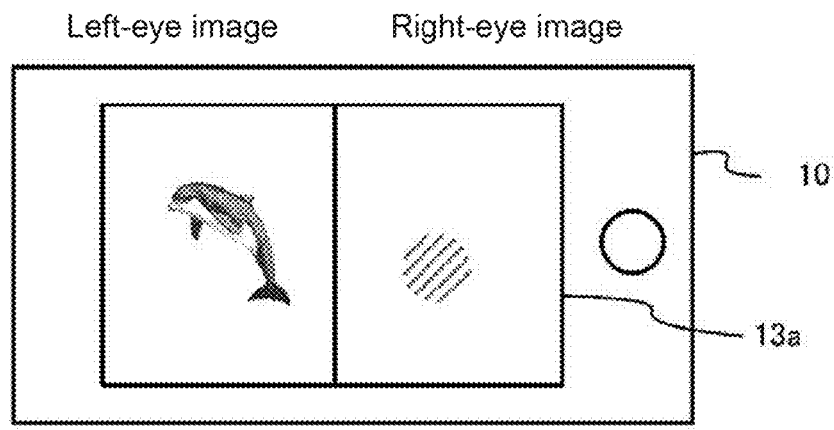
FIG. 13: An image for use in binocular vision examination in accordance with the first embodiment.
Figure 14A:
FIG. 14A: An explanatory diagram showing images for use in stereo vision examination displayed at a display unit in accordance with the first embodiment.
Figure 14B:
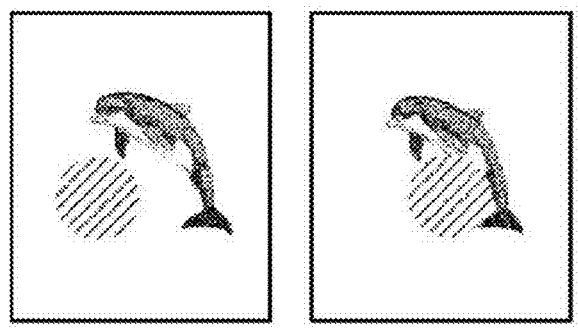
FIG. 14B: An explanatory diagram showing how the viewer sees the images in accordance with the first embodiment.

Next, a binocular vision examination program executed by the application execution unit 141 shall be described. FIG. 13 is an explanatory diagram showing images for use in binocular vision examination displayed at the display unit 13a in accordance with this embodiment. FIGS. 14A and 14B are explanatory diagrams showing how the viewer sees the images.

Figure 15A:
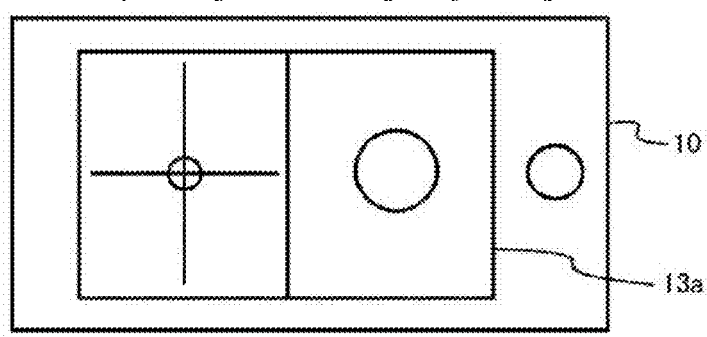
FIG. 15A: An explanatory diagram showing images for use in stereo vision examination displayed at a display unit in accordance with the first embodiment.
Figure 15B:
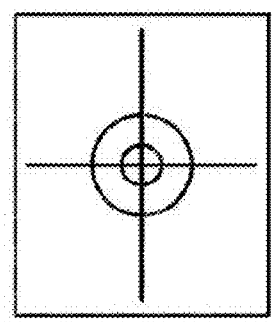
FIG. 15B: An explanatory diagram showing how the viewer sees the images in accordance with the first embodiment.
Figure 15C:
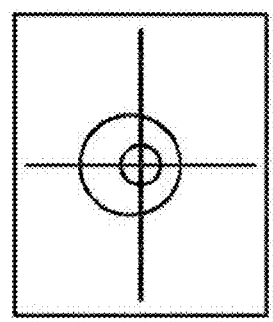
FIG. 15C: An explanatory diagram showing how the viewer sees the images in accordance with the first embodiment.

When the viewer operates the terminal 10, a binocular vision examination program is read from the memory 15 by the application execution unit 141, and a right-eye image (a sphere) and a left-eye image (a dolphin) are displayed on the screen as shown in FIG. 15A. When the viewer peers at the pair of lens units 21 and 21 and observes these images, if the viewer's binocular vision function is normal, the two images appear to be disposed at a predetermined position, as shown in FIG. 15B. However, if the binocular vision function is not normal, the positions of the two images seem to be displaced, as shown in FIG. 15C. In this sort of situation, a message urging ophthalmologic examination and information on the sites of cooperating hospitals are displayed.

Figure 16A:
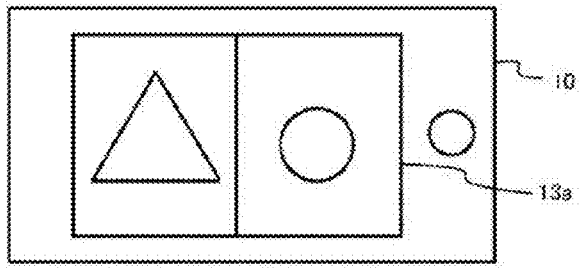
FIG. 16A: An explanatory diagram showing images for use in stereo vision examination displayed at a display unit in accordance with the first embodiment.

It should be noted that the application execution unit 141 may display simple images as well as the sort of images shown in FIGS. 13, 14A and 14B. Specifically, as shown in FIG. 15A, the image of a circle may be displayed as the right-eye image and a small circle and lines intersecting the center of the circle may be displayed as the left-eye image. Also, for example, as shown in FIG. 16A, the image of a circle may be displayed as the right-eye image and the image of a triangle sized so that the right-eye circle can fit inside may be displayed as the left-eye image.

Figure 16B:
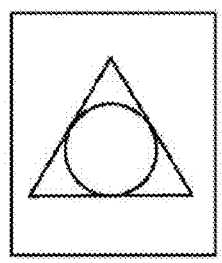
FIG. 16B: An explanatory diagram showing how the viewer sees the images in accordance with the first embodiment.
Figure 16C:
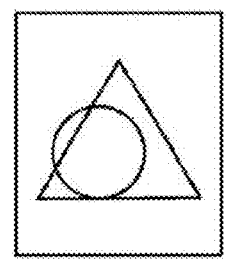
FIG. 16C: An explanatory diagram showing how the viewer sees the images in accordance with the first embodiment.

When the viewer peers at the pair of lens units 21 and 21 and observes these images, if the viewer's binocular vision function is normal, the centers of the two images are superimposed as shown in FIG. 15B and FIG. 16B. However, if the binocular vision function is not normal, the positions of the two images seem to be displaced, as shown in FIG. 15C and FIG. 16C. In this sort of situation, a message urging ophthalmologic examination and information on the sites of cooperating hospitals are displayed. It should also be noted that the image that is seen if binocular vision is normal and the image that appears when displaced may be displayed on the screen after the observation so that the viewer can confirm what was seen without looking through the lens units 21.

This manner, whether or not the binocular vision function is normal can be easily determined by executing the binocular vision examination program. As a result, a person whose binocular vision function is not working correctly can view 3D movies and can avoid the occurrence of visually induced motion sickness.

Stereo Video Observation System

Figure 23:
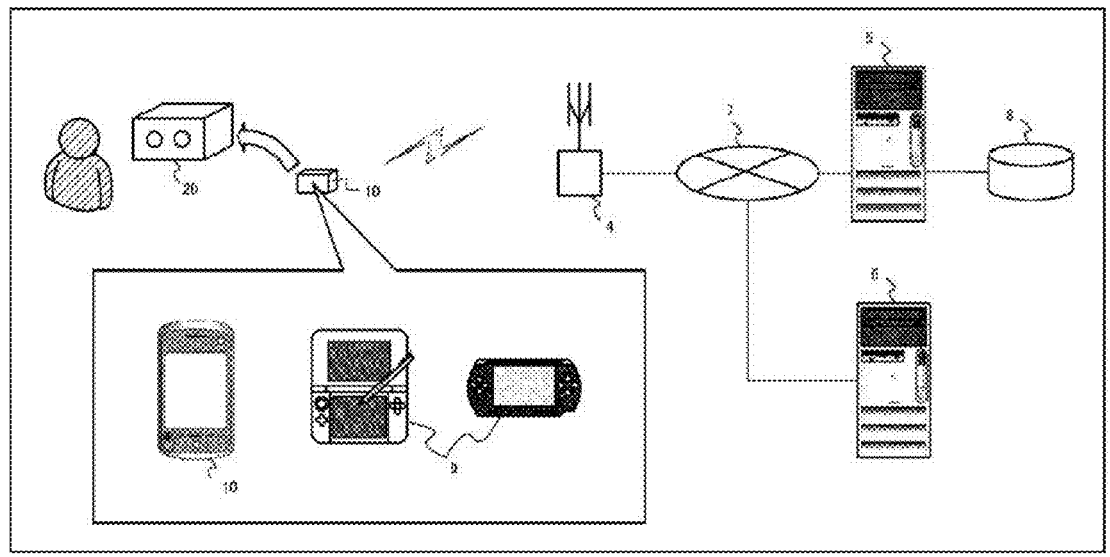
FIG. 23: An explanatory diagram showing the schematic configuration of a stereo video distribution system in accordance with the first embodiment.

Next, a stereo video observation system which allows the viewer to observe stereo video using the stereo video observation device described above shall be described. FIG. 23 is an explanatory diagram showing the schematic configuration of a stereo video distribution system in accordance with this embodiment.

As shown in the drawing, the stereo video distribution system is a system which allows observing stereo video via a communication network 7; disposed on the communication network 7 are a management server 5 and various types of service provision servers 6 that provide various types of services. In addition, a wireless base station 4 and an information processing terminal 10 that can communicate wirelessly via the wireless base station 4 are connected to the communication network 7.

The communication network 7 is a distributed communication network (IP network) constructed by interconnecting various types of communication circuits (public circuits such as telephone circuits and ISDN circuits, ADSL circuits, optical communication circuits; dedicated circuits, wireless communication networks) using the communication protocol TCP/IP. Included in this communication network 7 are the Internet, intranets (networks within a company) using 10 BASE-T and 100-BASE-TX, etc., and LANs such as in-home networks. Also, it is possible to connect to the communication network 7 via wired connections and WiFi communication. For example, if WiFi routers or wireless LAN routers or the like are access points, it is possible to connect a game machine 9 that is capable of wireless communication to these, and to have bidirectional communication between the management server 5 and the game machine 6.

The wireless base station 4 is a device which connects to the communication network 7 via a relay device that is not shown in the drawing, establishes a wireless communication connection with the information processing terminal 10, and provides voice or data communication using the information processing terminal 10. The relay device is a node device such as a modem or terminal adapter or gateway device for connecting to the communication network 7; it performs tasks such as selecting a communication path, exchanging data (signals), and relaying between the wireless base station 4 and the communication network 7.

The management server 5 is a server device which performs customer management, such as authenticating the viewers who are viewing stereo video when stereo video content is watched, and distributes the various programs and video content for the above-mentioned stereo video examinations and visual acuity recovery. It is a server computer which performs information transmission in the WWW (World Wide Web) document system of HTML (Hyper Text Markup Language) files and image files and music files, etc., or is software which has these functions. The management server 5 stores information such as HTML documents and images in advance, and in response to a request from client software such as a Web browser it transmits that information via an IP network such as the Internet.

The management server 5 is also provided with a database 8 for managing customers. The database 8 includes the name associated with a customer ID, telephone number, and credit card information, as well as information on the results of training such as a visual acuity recovery program, and historical information on the content of stereo video that was watched, etc.

The multiple service provision servers 6 are a group of servers that provide various types of services to viewers via the management server 5. Included in the multiple service provision servers 6 are medical servers such as ophthalmologists, content distribution servers that distribute stereo video content such as movies or dramas, and settlement servers that issue charges for content that was watched.

The procedure for a viewer to observe stereo video in a video observation system with this sort of structure shall be described. First, the casing 20, which is a 3-D viewer, is distributed at movie theaters or street corners. When doing so, a QR code (registered trademark) for accessing the management server 5 will have been printed on the casing 20 in advance; if this QR code (registered trademark) is photographed with the camera 16 of the information processing terminal, it becomes possible to access the website of the management server 5. It should be noted that in addition to accessing the website of the management server 5 by reading the QR code (registered trademark) with the camera 16, it is also possible for a user to input a keyword for the video observation system at a Web browser, or gain access by directly inputting a URL.

Now, to begin, a webpage for member registration is displayed to the viewer accessing the management server 5, and the viewer is prompted to input information such as name and address. The inputted member information is associated with a newly issued customer ID, and stored in the database 8. The management server 5 transmits guidance information on newly created 3-D movies, for example, to the information terminal 10 of the viewer who has registered as a member. If the viewer performs an operation to watch a 3-D movie, the management server 5 checks the binocular vision examination results previously stored at the database 8. If a binocular vision examination has not been performed, a message requesting a binocular vision examination is sent to the information processing terminal 10, and the binocular vision examination program is distributed.

The sort of left-eye image and right-eye image shown in FIG. 13 are displayed at the display unit 13a of the information processing terminal 10 by the binocular vision examination program. The viewer observes the left-eye image and right-eye image from the lens units 21 and 21 of the casing 20, and examines whether the two images appear to be disposed at a predetermined position as shown in FIG. 14A or if the two images appear to be displaced as shown in FIG. 14B. Subsequently, the viewer sends the examination result information to the management server 5 by operating the information processing terminal 10. It should be noted that the examination result includes the item of whether or not visually induced motion sickness occurred when stereo video was observed during examination. This information too is sent to the management server 5.

When the management server 5 acquires examination result information indicating that the stereo video was not observed normally or acquires examination result information indicating that visually induced motion sickness occurred, the management server sends website information for ophthalmologists (hospitals) in the service provision server 6 to the information processing terminal 10 and distributes a stereo vision training program.

On the other hand, if the examination result was normal, it becomes possible to download 3-D movie content. Thus content such as 3-D movie content is distributed from a movie content distribution server that is among the multiple service provision servers 6. Subsequently, the information that video content was watched is recorded at the database 8 of the management server 5, and charge processing by the settlement server, etc. is performed on the basis of this viewing history information.

Program Recording Media

Figure 34:
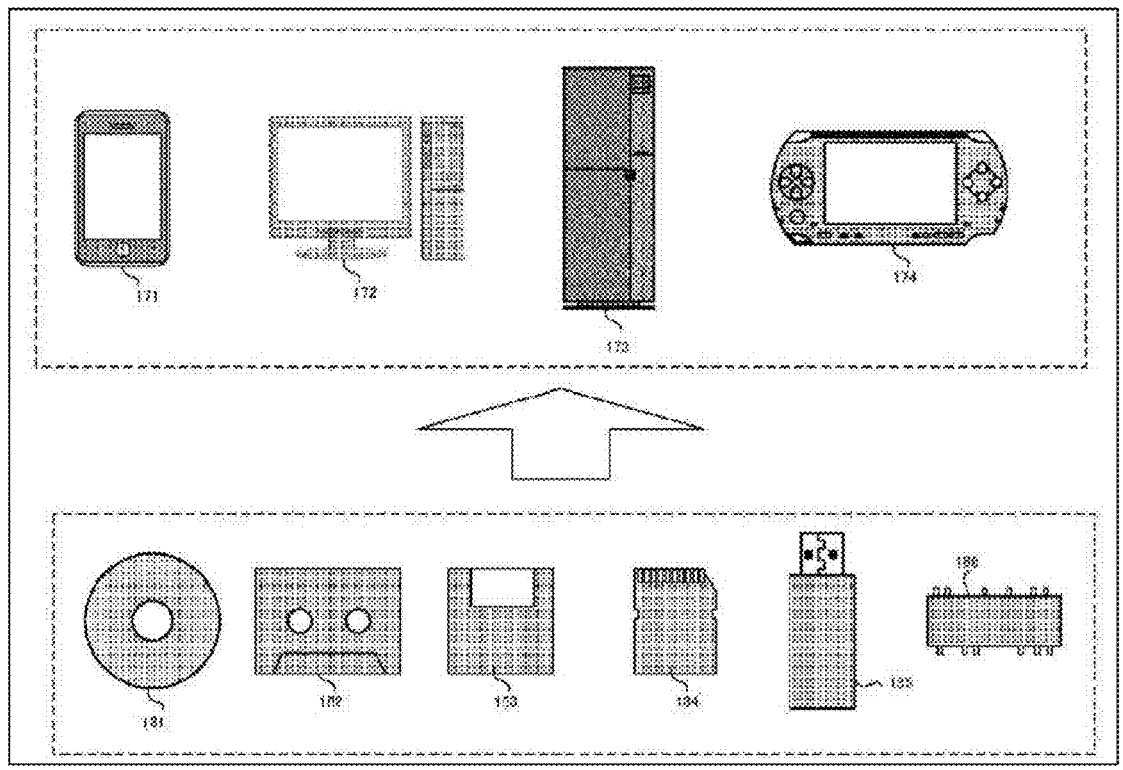
FIG. 34: An explanatory diagram showing computer-readable recording media that record a video observation program in accordance with an embodiment.

As shown in FIG. 34, the various programs in accordance with the embodiment described above can be installed in a portable terminal device 171 that integrates a portable telephone and communication functions with a portable information terminal (PDA), a personal computer 172 that can be used by at the client side, a server device 173 that is installed in a network and provides data or functions to the client side, a dedicated device 174 such as a game device, or an IC chip 186, and are executed at a CPU, thus making it possible to easily construct a system that has the various functions described above. These programs can be distributed through communication circuits, for example, or may be transferred as a package application which operates on a standalone computer.

Also, such programs can be recorded on recording media 181-85 that can be read by a personal computer. Specifically, as shown in FIG. 34, they may be recorded on various types of recording media, such as magnetic recording media such as a flexible disk 183 or a cassette tape 182, or on an optical disk 181 such as a CD-ROM or DVD-ROM, or in a USB memory 185 or memory card 184, etc.

Operation and Effect

As result of this sort of embodiment, it is possible to display right-eye and left-eye images using the portable information terminals 10 which many people own, and the configuration is minimal—the pair of lens units 21 and 21, etc.—so it becomes possible to easily and cheaply observe stereo video without using expensive equipment such as polarization lenses or lens filter control mechanisms.

Therefore, it is possible to manufacture many of the constituent members other than the information processing terminal 10 and to distribute the casing 20 at a variety of locations, so the opportunities for allowing many users to observe stereo video can be increased. As a result, it is possible to examine whether or not visually induced motion sickness will occur prior to viewing, and it is possible to prevent injury to preschool children whose binocular vision function is at the developing stage, and to adults whose binocular vision function is not normal, and to enable stereo video content to be viewed safely.

To explain in more detail, previously, when watching a 3-D movie at a movie theater, for example, there was no examination as to whether or not visually induced motion sickness would occur, so preschool children whose binocular vision function is at the developing stage and adults whose binocular vision function is not normal would watch a 3-D movie and suffer visually induced motion sickness. In order for customers who want to watch a movie to watch a movie safely, it is necessary to examine whether or not visually induced motion sickness will occur in advance. To check whether or not visually induced motion sickness would occur, one had to be examined at a hospital, etc. or purchase an expensive stereo video observation device and actually observe a stereo video.

Nevertheless, purchasing a stereo video observation device for use in examination or being examined at a hospital, etc. imposed great burdens in terms of cost and time. Alternatively, one could contemplate installing stereo video observation devices in stores, but installing large quantities of expensive stereo video observation devices for use in examination is a problem because of increasing the burden of cost.

According to the present embodiment it is possible to observe stereo video with the simple configuration of the portable information terminal 10 that one owns and a casing 20 that is distributed to movie theaters, so it is possible to easily and quickly examine whether or not visually induced motion sickness will occur before viewing a 3-D movie. As a result, users who experience visually induced motion sickness will suspend their viewing, so the injury of visually induced motion sickness can be prevented, and stereo video content can be viewed safely.

Also, according to the present embodiment a viewer who experiences visually induced motion sickness can have his or her binocular vision function trained using a stereo video training program, so the binocular vision function can be made normal, and as result it becomes possible to view stereo video content safely.

In addition, in this embodiment the portable information terminal is placed on the stage unit 23, and the positional relationship of the pair of lens units 21 and 21 and the stage unit 23 is fixed by the linking unit 28, and information processing terminal is positioned on the surface of the stage unit 23 by the holding unit 24, so when the viewer reviews video from the pair of lens units 21 and 21 the right-eye focal point matches only the right-eye image and the left-eye focal point matches only the left-eye image, and easy and excellent stereo video can be observed.

Also, in the present embodiment reference markings are made on the stage unit 23 for matching the video position displayed at the display unit 13a, so simply by positioning the information processing terminal on the basis of these reference markings it is possible to place the information processing terminal at the position where the stereo video can be appropriately observed, and setting up for observing stereo video is easy to perform.

In addition, according to the present embodiment the information processing terminal 10 changes the size, position, and aspect ratio of the video displayed at the display unit 13a in accordance with the type of the information processing terminal 10, which is inputted from the model information acquisition unit 142, and changes the position of the reference marks that indicate the reference position of the video, so it becomes possible to set the arrangement in accordance with information processing terminals 10 made by different manufacturers and having different standard sizes. As a result, it becomes possible to observe stereo video with many types of information processing terminals 10, and it is possible to expand the opportunities for observing stereo video to many users.

In addition, according to the present embodiment, in the information processing terminal 10 the application execution unit 141 displays stereo video created by generating a convergence angle and parallax between left-eye video and right-eye video corresponding to the left and right eyes of the viewer, and changes the convergence angle and parallax of the stereo video, and thereby guides the focal point with respect to the eyes of the observer so as to approach toward or recede from the viewer, so when the viewer observes video from the pair of lens units 21 and 21, the right-eye focal point matches only the right-eye video and the left-eye focal point matches only the left-eye video, and excellent stereo video can be observed.

Second Embodiment

Figure 8:
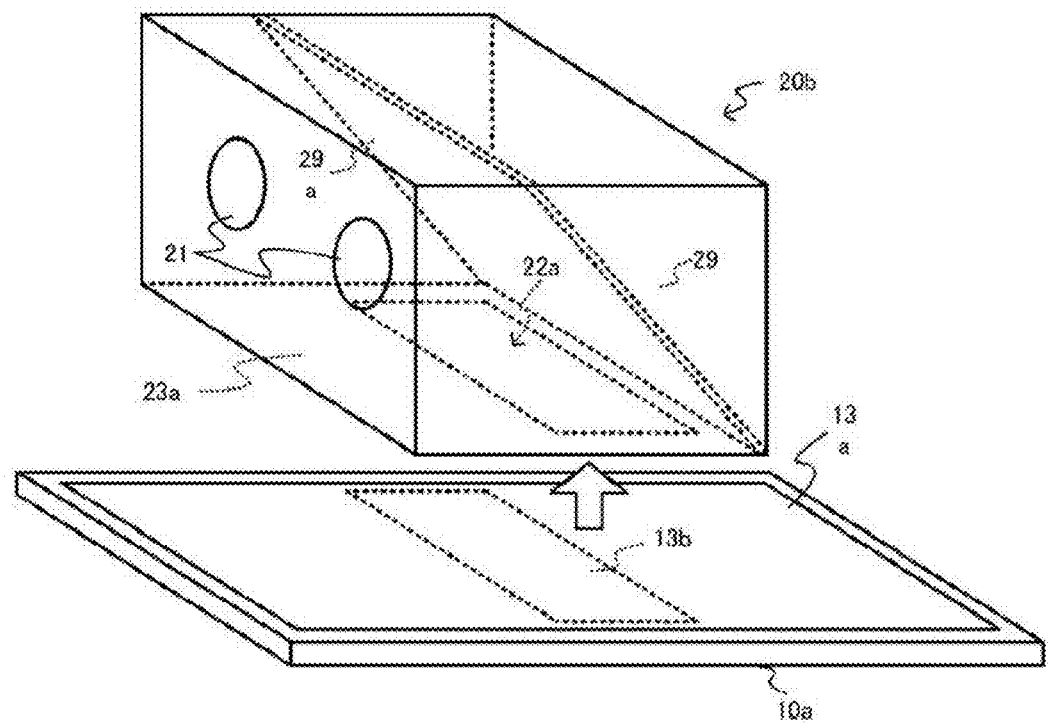
FIG. 8: An oblique view showing the overall configuration of a stereo video display device in accordance with the second embodiment.
Figures 9A, 9B:
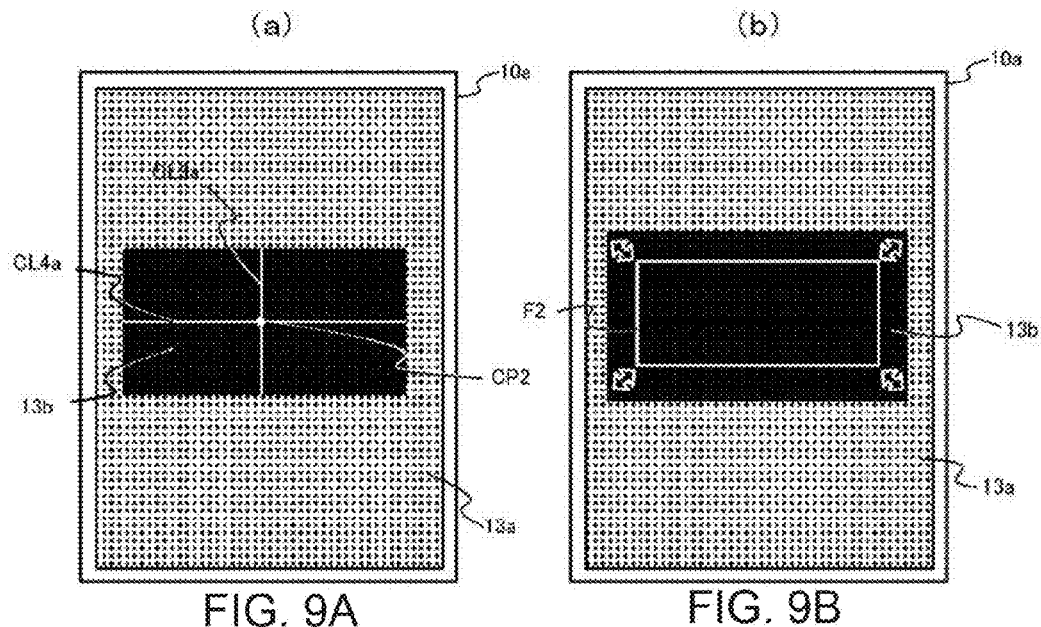
FIG. 9A: A plain view for explaining the centerlines for position adjustment that are displayed on the screen in accordance with the second embodiment.
FIG. 9B: A plain view for explaining the frame for adjusting the stereo video display range in accordance with the second embodiment.

Next, a second embodiment of the present invention shall be described. This embodiment deals with the situation of using an information processing terminal 10a of a size that cannot be accommodated within the casing. FIG. 8 is an oblique view showing the overall configuration of a stereo video display device in accordance with the second embodiment. FIG. 9A is a plan view for explaining the centerlines for position adjustment that are displayed on the screen in accordance with the second embodiment, and FIG. 9B is a plan view for explaining the frame for adjusting the stereo video display range. It should be noted that in the following embodiments and modifications, constituent elements that are the same as in the previously described embodiments are assigned the same codes, and their functions are the same, unless specially noted, so discussion thereof shall be omitted.

The video observation system in this embodiment consists of a casing 20a and information processing terminal 10a. The information processing terminal 10a in this embodiment is a size that is larger than the information processing terminal 10 in the first embodiment. Also, in this embodiment the stage unit 23a of the casing 20 is provided at the front of the side face sheet. Also, an opening 22a for admitting image light displayed at the display unit 13a is provided in the side face sheet where the stage unit 23a is provided. Also, in this embodiment the information processing terminal 10a is placed on the stage unit 23a, and so is configured so that a predetermined region 13b at the display unit 13a is positioned at the position of the opening 22a provided in the side face sheet.

Also, in this embodiment a mirror unit 29 is provided inside the casing 20a; it is held by the linking unit 28 between the pair of lens units 21 and 21 and the stage unit 23a, and reflects video light displayed at the information processing terminal 10a toward the pair of lens units 21 and 21. Specifically, the mirror unit 29 has a reflective face 29a that faces the pair of lens units 21 and 21, and is disposed at a slant so that video light emitted from the interior of the opening 22a is reflected toward the pair of lens units 21 and 21.

Also, in this embodiment the application execution unit 141 executes a position adjustment program, thereby changing the size, position, and aspect ratio of video displayed at the display unit 13a on the basis of information pertaining to the type of the information processing terminal 10a, and changing the position the reference marks indicating the video reference position.

In this embodiment the information processing terminal 10a is large, so instead of displaying video at the entire surface of the video display unit 13a, the application execution unit 141 changes the size, position, and aspect ratio of the video so as to display the video at the predetermined region 13b of the display unit 13a, as shown in FIGS. 9A and 9B.

Subsequently, as shown in FIG. 9A, within the predetermined region 13b the application execution unit 141 displays a lateral-direction center line CL4a which passes through the center CP2 of the predetermined region 13b and a vertical-direction center line CL3a which passes through the center CP2 of the screen as reference marks indicating the video reference position. Also, as shown in FIG. 9B, the application execution unit 141 displays an outer frame F1a for enlarging or contracting the display range of the stereo video, and makes it possible to change the display range on the basis of user operations.

Third Embodiment

Figure 17:
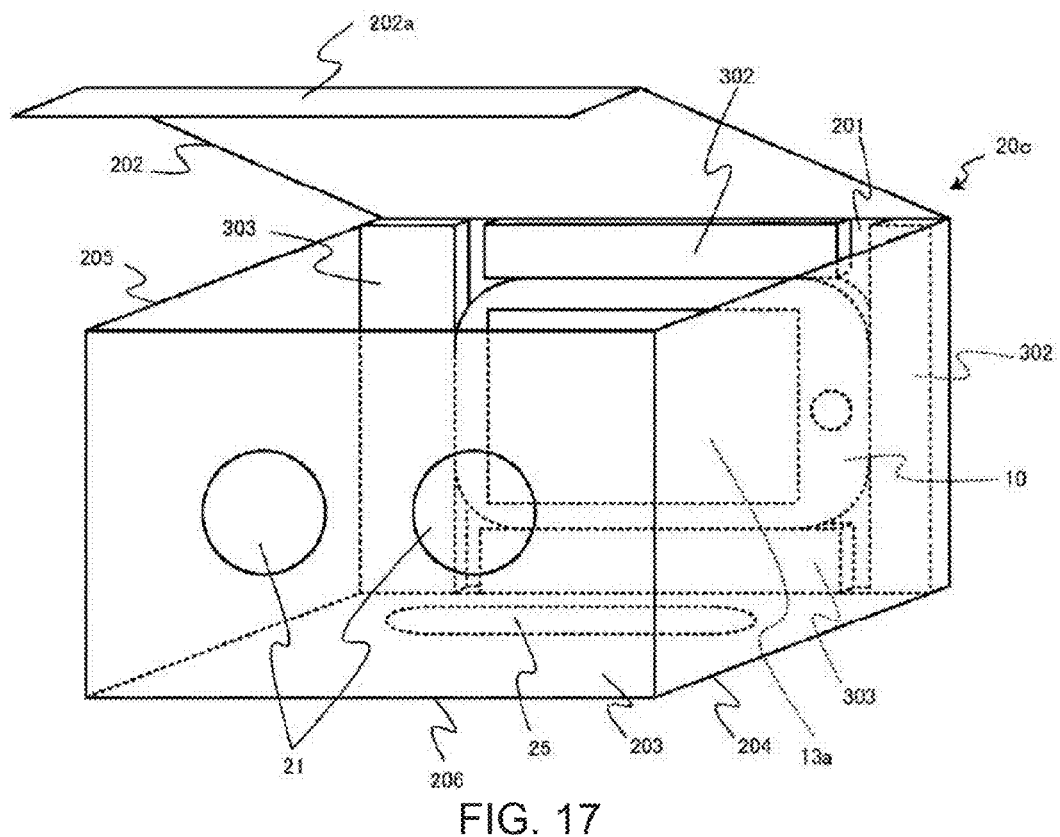
FIG. 17: An oblique view showing the overall configuration of a stereo video display device in accordance with the third embodiment.
Figure 18:
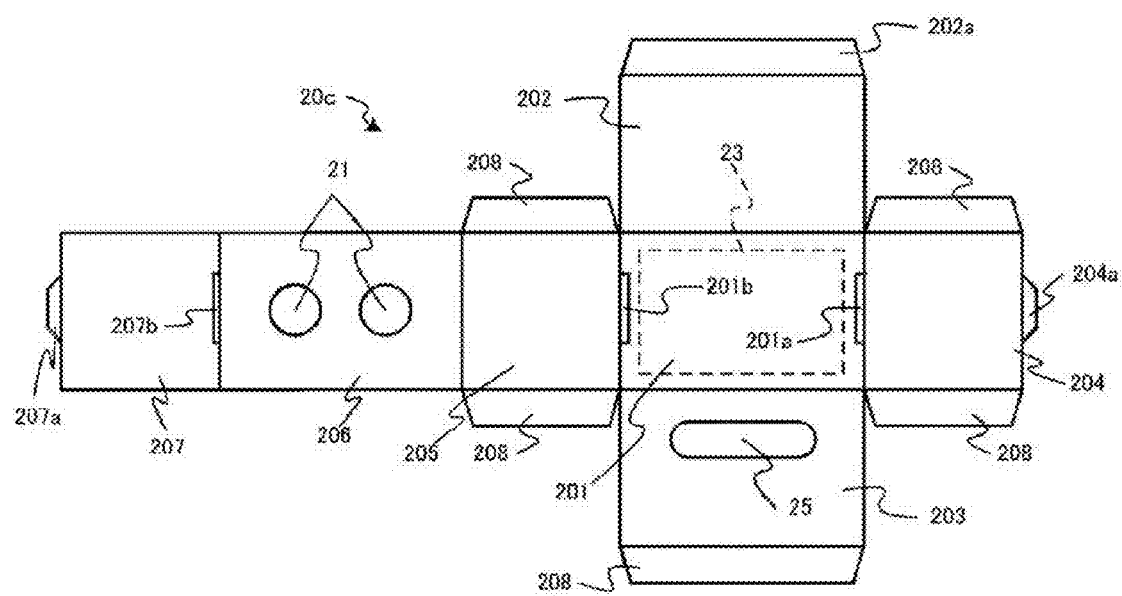
FIG. 18: An exploded view of a casing in accordance with the third embodiment.
Figure 20:
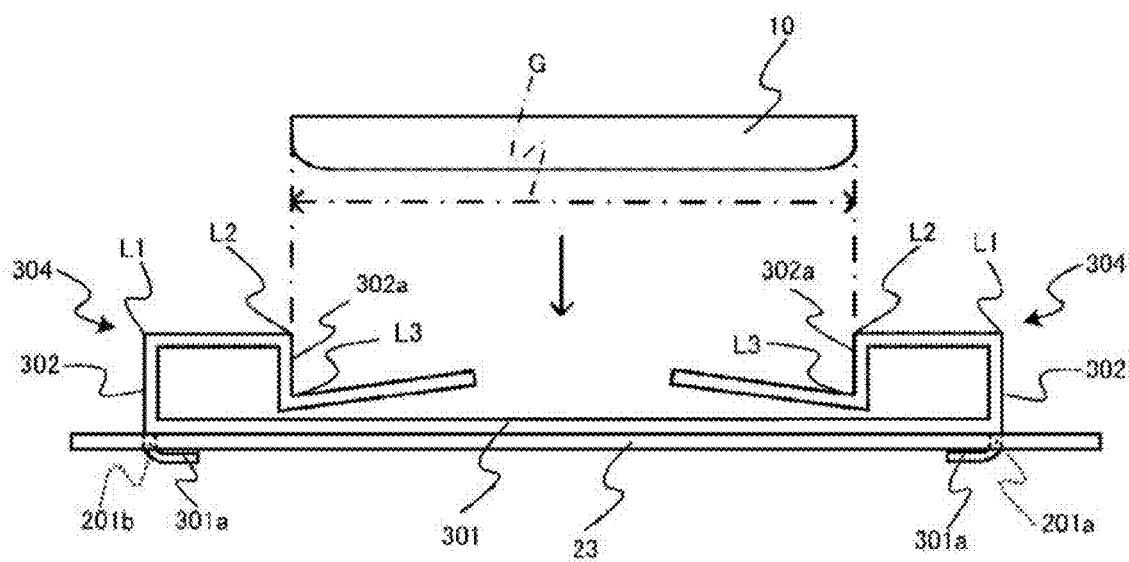
FIG. 20: An explanatory diagram showing an information processing terminal held by a holding unit in accordance with the third embodiment.

Next, a third embodiment of the present invention shall be described. In this embodiment, another configuration of the holding unit shall be described. FIG. 17 is an oblique view showing the overall configuration of a stereo video display device in accordance with the third embodiment. FIG. 18 is an exploded view of a casing in accordance with the third embodiment. FIG. 19 is an exploded view of a holding unit in accordance with the third embodiment. FIG. 20 is an explanatory diagram showing an information processing terminal held by a holding unit in accordance with the third embodiment. It should be noted that in this embodiment, constituent elements that are the same as in the previously described embodiments are assigned the same codes, and their functions are the same, unless specially noted, so discussion thereof shall be omitted.

As shown in FIG. 17, the casing 20c in this embodiment has an essentially rectangular oblong shape and is made from a material such as paper or plastic. The pair of lens units 21 and 21 are provided in a front sheet 206 in the longitudinal direction, and the stage unit 23 is formed at the back sheet 201, which faces the front sheet 206.

As shown in FIG. 18, the back sheet 201 where the stage unit 23 is formed is linked at the respective edges to a top sheet 202, bottom sheet 203, right-side sheet 204, and left-side sheet 205 with creases interposed. Also, a front sheet 206 where the pair of lens units 21 and 21 are provided is linked to the left-side sheet 205 at the opposite side from the stage unit 23. Also, an inside face sheet 207 that is disposed in the interior of the casing 20c when the casing is assembled is linked to the left-side sheet 205 in the opposite direction.

The top sheet 202 is linked to the back sheet 201 of the stage unit 23, and has the function of serving as an upper lid when assembled. The information terminal 10 can be inserted into and removed from the interior thereof from the opening portion when the upper lid is open. An insertion part 202a is configured at the tip portion of the upper sheet 202, with a crease interposed at the tip, for insertion into the inside of the front sheet 206 portion. Inserting this insertion part 202a into the interior of the casing 20c prevents external light from entering the interior of the casing 20c.

Also, as shown in FIG. 18, a locking piece 204a is formed at the right-side sheet 204 at the edge in the opposite direction from the stage unit 23. During assembly, this locking piece 204a is inserted into and engaged with a locking hole 207b provided in the inside face sheet 207. Also, a locking piece 207a is formed at the left edge of the inside face sheet 207; during assembly, this locking piece 207a is inserted into and engaged with a locking hole 201a provided at the right edge of the back sheet 201 where the stage unit 23 is formed. In addition, sticking tabs 208, which touch each sheet and are adhered by an adhesive material, are formed at the right-side sheet 204, left-side sheet 205, and bottom sheet 203 of the casing 20c.

A holding unit 30 that holds the information processing terminal 10 is formed at the surface (the inside face when assembled) of the stage unit 23 of this sort of casing 20. In this embodiment the holding unit 30 is formed using a material such as paper or plastic. As shown in FIG. 19, a bottom sheet 301 that is placed on the stage unit 23, a pair of side holding pieces 303 and 303 that extend from the long side of the bottom sheet 301, and a pair of vertical holding sides 302 and 302 that extend from the short side are formed in an integrated manner.

The bottom sheet 301 is formed in a size slightly smaller than the outer edge of the back sheet 201 of the casing 20, and a pair of insertion pieces 301a and 301a engaging with the stage unit 23 is formed at the ends thereof opposite the bottom sheet 301. Specifically, the holding unit 30 is fixed to the casing 20c by inserting the pair of insertion pieces 301a and 301a into locking holes 201a and 201b arranged on the back sheet 201 of the casing 20c.

The pair of side holding pieces 303 and 303 and the pair of vertical holding sides 302 and 302 are each formed with creases lines L1, L2, and L3. Bending along these lines and forms a space in which the information processing terminal can be closely fitted, and the information processing terminal 10 is held as shown in FIG. 17.

Specifically, as shown in FIG. 20, the side fixing pieces 303 and the vertical fixing sides 302 are bent inward at crease lines L1 and crease lines L2 and bent outward at crease lines L3, thereby forming convex shapes 304 at the outer edge of four sides of the bottom sheet 301. Here, as shown in FIG. 20, distance G between the inside faces 302a of the pair of convex shapes 304 formed by the pair of vertical fixing sides 302 and 302 is configured to match the long-side length of the information processing terminal 10. Although not shown in the drawing, the distance between the pair of convex shapes formed by the pair of side fixing pieces 303 and 303 is configured to match the short-side length of the information processing terminal 10.

As result of this sort of configuration, when the information processing terminal 10 is inserted between the convex shapes, the convex shapes press into the information processing terminal 10 and fix the information processing terminal 10. This prevents positional displacement of the information processing terminal 10 even if the casing 20c is slanted. It should be noted that in this embodiment the creases L1, L2, and L3 are a plurality of markings based on the size of the information processing terminals 10 of different companies; it is possible to change the distance between convex shapes according to the selected creases. This makes it possible to set the arrangement in accordance with information processing terminals made by different manufacturers and having different standard sizes.

Forth Embodiment

Figure 29:
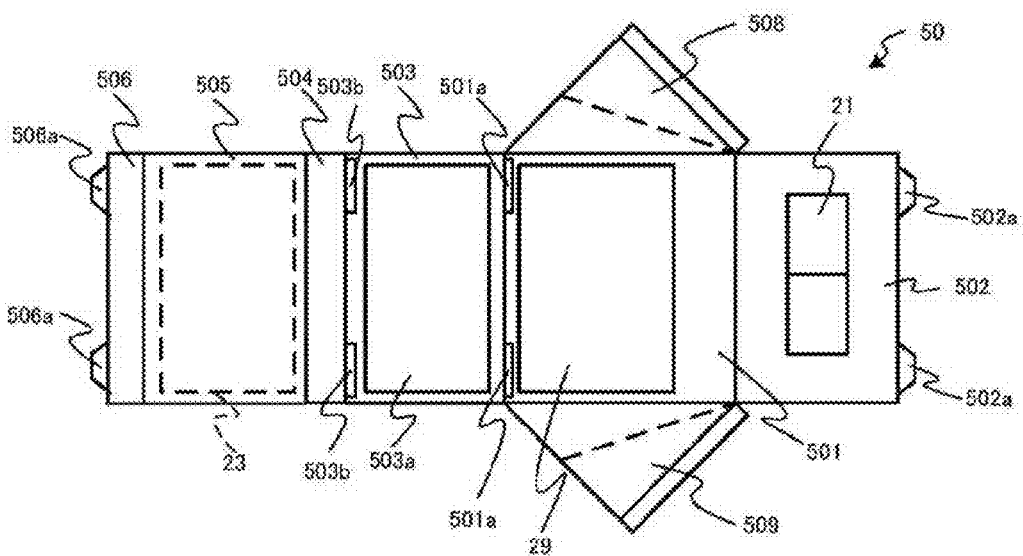
FIG. 29: An exploded view of a cover case in accordance with the fourth embodiment.
Figure 30:
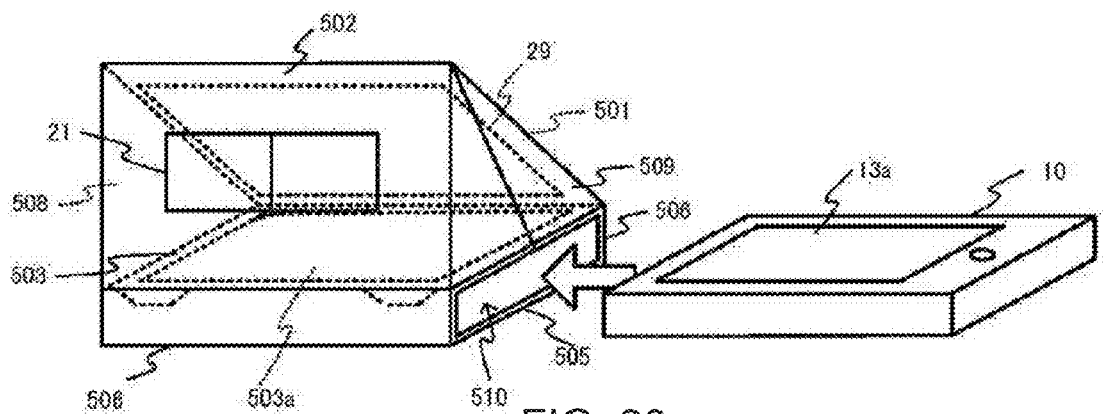
FIG. 30: An oblique view showing the overall configuration of a cover case in accordance with the fourth embodiment.
Figure 31:
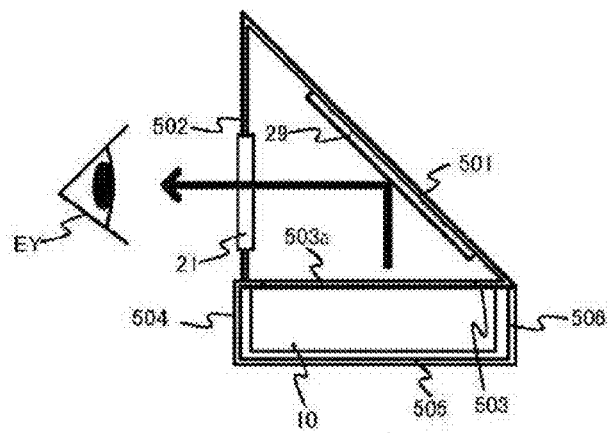
FIG. 31: A side view when a cover case in accordance with the fourth embodiment has been assembled.
Figure 32:
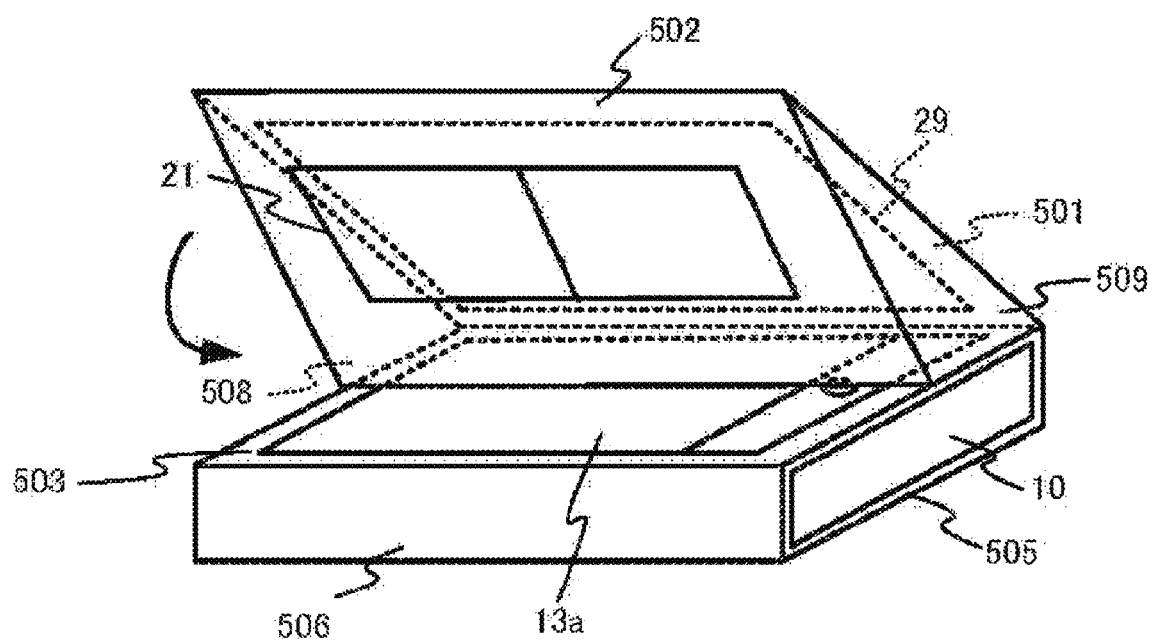
FIG. 32: An explanatory diagram showing a lens unit and a mirror unit in accordance with the fourth embodiment in a folded state when not in use.

Next, a fourth embodiment of the present invention shall be described. This embodiment summarizes a situation in which stereo video is observed using a cover case that houses the information processing terminal 10. FIG. 29 is an exploded view of a cover case in accordance with the fourth embodiment. FIG. 30 is an oblique view showing the overall configuration of a cover case in accordance with the fourth embodiment. FIG. 31 is a side view when a cover case in accordance with the fourth embodiment has been assembled. FIG. 32 is an explanatory diagram showing a lens unit and a mirror unit in accordance with the fourth embodiment in a folded state when not in use. It should be noted that in this embodiment, constituent elements that are the same as in the previously described embodiments are assigned the same codes, and their functions are the same, unless specially noted, so discussion thereof shall be omitted. Also, this embodiment explains an example in which a sheetlike Fresnel lens is used as the lens unit 21.

As shown in FIG. 29, a cover case 50 which houses the information processing terminal 10 is formed in an integrated manner by cutting from a single sheet of plastic, cloth, paper, etc., as in the exploded view shown in FIG. 29, and by bending becomes a box that can house the information processing terminal 10. This sort of cover case 50 has a right-side sheet 504 and a left-side sheet 506, which touch the side faces of the information processing terminal 10, linked with creases interposed to both sides of a bottom sheet 505, which serves as the stage unit 23 that holds the information processing terminal 10. Also, a top sheet 503, which touches the display portion of the information processing terminal 10 at the opposite side from the bottom sheet 505, is linked to the right-side sheet 504 with a crease interposed. The top sheet 503 has the function of protecting the display unit 13a; an opening 503a is formed in the central portion thereof, corresponding to the size of the display unit 13a of the information processing terminal 10.

Also, a mirror sheet 501, which is provided with a mirror unit 29, is linked to the top sheet 503 at the opposite side from the right-side sheet 504 with a crease interposed. In addition, a lens sheet 502, which is provided with a pair of lens units 21, is linked to the mirror sheet 501 at the side opposite the top sheet 503 with a crease interposed. Light-blocking sheets 508 and 509 for preventing external light from entering the interior of the casing when the mirror sheet 501 and the lens sheet 502 are assembled in a raised state are linked from the upper and lower edges with creases interposed. It should be noted that the light-blocking sheets 508 and 509 do not have to be integrally formed with other sheet members; for example, they may be cloth members, etc. which locked into the mirror sheet. Also, the light-blocking sheets 508 and 509 may be omitted, for example, they may be removed when used inside a room.

When the cover case 50 with this sort of configuration is assembled, it creates an interior space that is essentially a rectangular oblong disposed so that, as shown in FIG. 30, the bottom sheet 505 and the top sheet 503 face one another, and the right-side sheet 504 and the left-side sheet 506 face one another, and the information processing terminal 10 can be inserted into and removed from an opening portion 510. When this occurs, insertion pieces 502a and 502a which protrude from the edge of the lens sheet 502 are inserted into and engaged in locking holes 503b formed at the edge of the top sheet. Also, insertion pieces 506a and 506a which protrude from the edge of the left-side sheet 506 are inserted into and engage in locking holes 501a and 501a formed at the edge of the mirror sheet 501. Thus, as shown in FIG. 30, the three-dimensional shape is maintained. When the cover case 50 is assembled, the lens sheet 502 is erected perpendicular to the surface of the display unit 13a of the information processing terminal 10, and the mirror sheet 501 is slanted at an angle of essentially 45° in relation to the surface of the display unit 13a. It should be noted that the angle between the mirror sheet 501 and the lens sheet 502 is not restricted as long as an image displayed at the display unit 13a is reflected by the mirror unit 29 and enters the lens unit 21 and the viewer can observe stereo video well.

In this sort of configuration, with the cover case 50 assembled and the information processing terminal 10 housed in the interior thereof, when stereo video is displayed at the display unit 13a, as shown in FIG. 31, light emitted from the display unit 13a passes through the opening portion 503a and is incident on the mirror unit 29, is reflected at the reflective face 29a, and exits toward the side of the pair of lens units 21 and 21. Then the respective right-eye image and left-eye image become incident at the pair of lens units 21 and 21, and stereo video can be viewed at viewer eye EY.

Also, in this sort of embodiment, a user who has difficulty seeing near things well, as in the case of elderly eyes or the focus freeze phenomenon, can perform adjusting exercises (stretches) for various eye muscles, and can easily adjust focus. It should be noted that in this embodiment a holding unit for holding the information processing terminal 10 may be provided at the stage unit 23 of the cover case 50. The configuration of this holding unit may be that of the holding unit 24 or the holding unit 30 as in previous embodiments, or may be another configuration.

In addition, the cover case 50 also has the function of being an ordinary cover case. When not viewing stereo video, as shown in FIG. 32, it is folded so that the lens sheet 502 and the mirror sheet 501 overlap, and folded so that the lens sheet 502 is sandwiched between the mirror sheet 501 and the top sheet 503. This protects the information processing terminal 10, and the lens units 21 and 21 and the mirror unit 29 are positioned at the inside of the sheets, so it is possible to prevent the lenses and mirror, etc. from cracking if subjected to an external shock.

Fifth Embodiment

Figure 36:
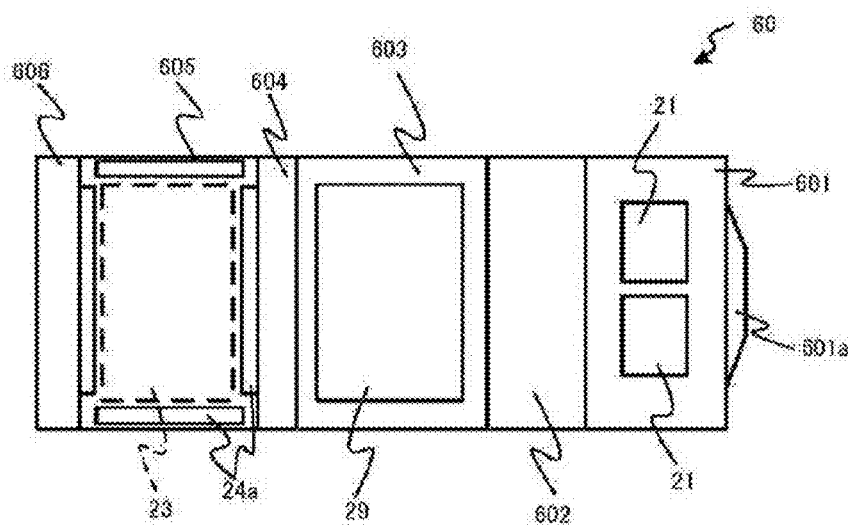
FIG. 36: An exploded view of a cover case in accordance with the fifth embodiment.
Figure 37:
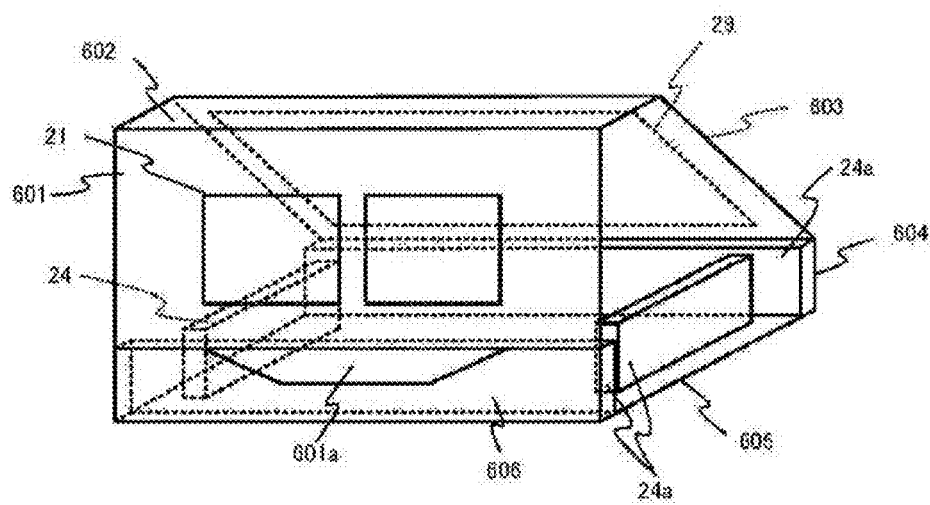
FIG. 37: An oblique view showing the overall configuration of a cover case in accordance with the fifth embodiment.
Figure 38:
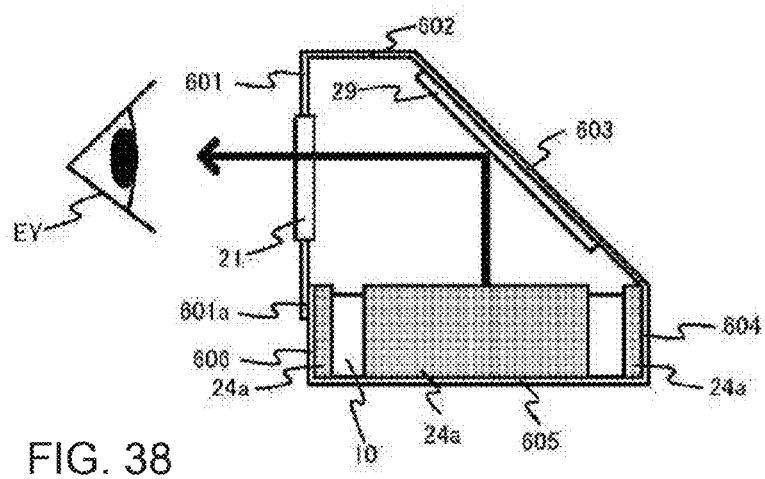
FIG. 38: A side view when a cover case in accordance with the fifth embodiment has been assembled.
Figure 39:
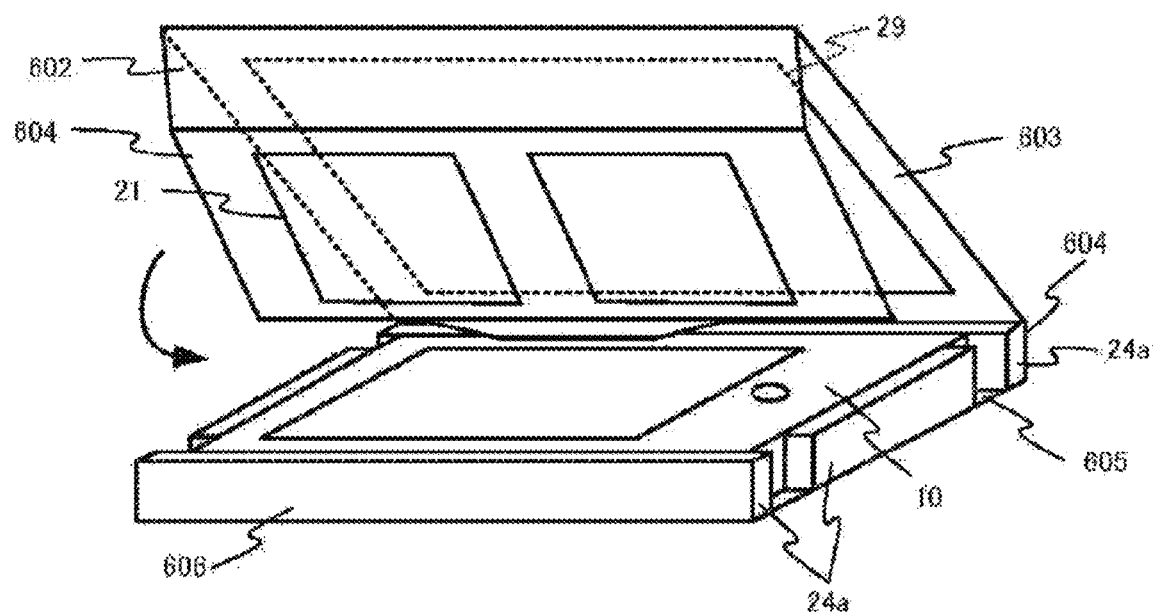
FIG. 39: An explanatory diagram showing a lens unit and a mirror unit in accordance with the fifth embodiment in a folded state when not in use.

Next, a fifth embodiment of the present invention shall be described. This embodiment describes another configuration for the cover case. FIG. 36 is an exploded view of a cover case in accordance with the fifth embodiment. FIG. 37 is an oblique view showing the overall configuration of a cover case in accordance with the fifth embodiment. FIG. 38 is a side view when a cover case in accordance with the fifth embodiment has been assembled. FIG. 39 is an explanatory diagram showing a lens unit and a mirror unit in accordance with the fifth embodiment in a folded state when not in use. It should be noted that in this embodiment, constituent elements that are the same as in the previously described embodiments are assigned the same codes, and their functions are the same, unless specially noted, so discussion thereof shall be omitted. Also, this embodiment explains an example in which a sheetlike Fresnel lens is used as the lens unit 21.

As shown in FIG. 36, a cover case 60 which houses the information processing terminal 10 is formed in an integrated manner by cutting from a single sheet of plastic, cloth, paper, etc., as in the exploded view shown in FIG. 35, and by bending becomes a box that can house the information processing terminal 10. This sort of cover case 60 omits the top sheet 503 that links the right-side sheet 504 and the mirror sheet 503 [sic] shown in the fourth embodiment; instead, the configuration features a top sheet 602 linking a lens sheet 601 and the mirror sheet 603

Specifically, the cover case 60 is configured such that a right-side sheet 604 and a left-side sheet 606 that touch the side faces of the information processing terminal 10 are linked from both sides of a bottom sheet 605 that forms the stage unit 23 supporting the information processing terminal 10 with creases interposed. Also, the mirror sheet 603 where the mirror unit 29 is provided is linked to the right-side sheet 604 at the side opposite the bottom sheet 605 with a crease interposed, and the top sheet 602 is linked to the mirror sheet 603 at the side opposite the right-side sheet 604 with a crease interposed. The lens sheet 601 where the pair of lens units 21 is provided is linked to the top sheet 600 to at the side opposite the mirror sheet 603 with a crease interposed. It should be noted that although not shown in the drawings, in this embodiment, light-blocking sheets for preventing the entry of external light into the casing when the cover case is assembled may be formed in an integrated manner with another sheet member, or may be provided in a detachable manner as cloth members, etc.

Also, the fourth embodiment described above was configured so that information processing terminal 10 was housed inside the cover case by being slid in from the side, but this embodiment is configured so that holding units 24a for positioning the information processing terminal 10 that is placed on the stage unit 23 are disposed at the edge portions of the state unit 23, and the information processing terminal 10 is inserted and removed from above.

Here, members formed as flexible members such as sponge or urethane are used as the holding units 24a, and are placed on the stage unit 23 so as to touch the sides of the information processing terminal 10. Also, a plurality of marks indicating the locations for gluing the holding units 24a are made on the surface of the stage unit 23 (bottom sheet 605), in accordance with the sizes of the information processing terminals 10 of different companies, so that the information processing terminals of different companies can be disposed at the appropriate position.

It should be noted that the holding units 24a and 24a that touch the side faces of the information processing terminal 10 in the long direction may also be fixed to the inside face of the right-side sheet 604 and the left-side sheet 606. In this case, it is possible to appropriately hold the information processing terminal 10 in accordance with the size of the information processing terminals 10 of different companies by modifying the thickness of the holding units 24a.

The holding units 24a I told the information processing terminal 10 are flexible members, but are not limited to this. Other configurations are possible, as in the case of the holding units 24 and the holding units 30 of the embodiments described above. Also, the holding units 24a used in this embodiment may be used in other embodiments and modifications.

Figure 43:
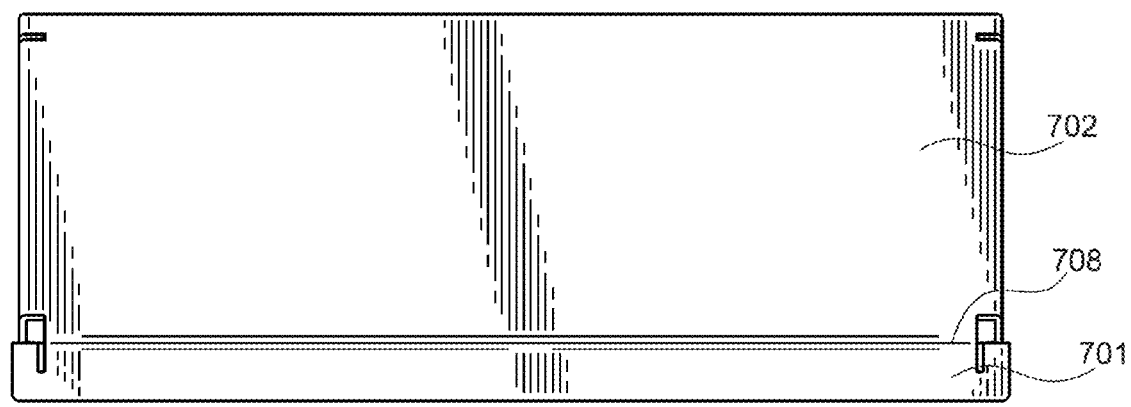
FIG. 43: A rear view of a video observation apparatus in an assembled state in accordance with the sixth embodiment.
Figure 44:
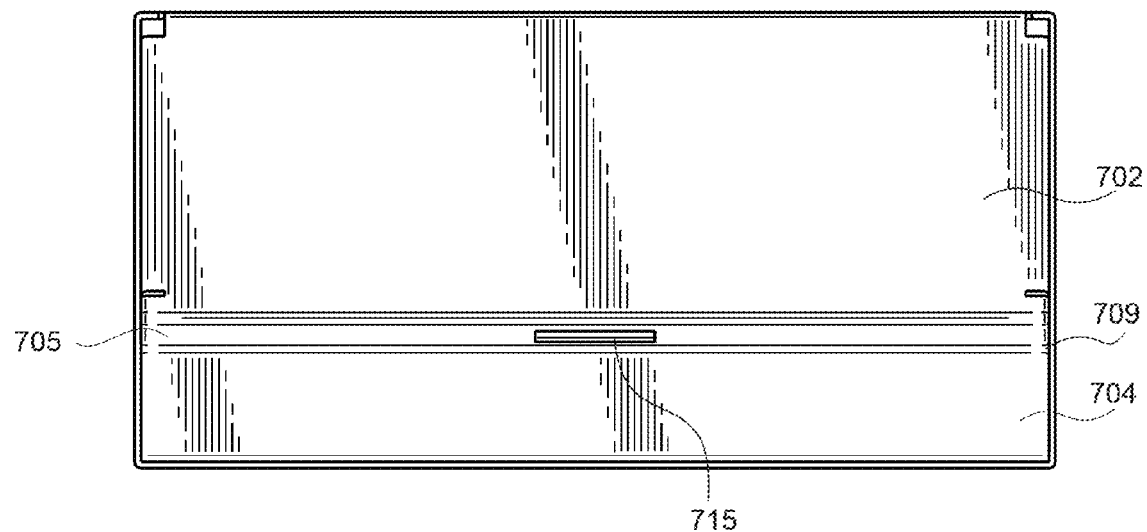
FIG. 44: A plain view of a video observation apparatus in an assembled state in accordance with the sixth embodiment.
Figure 45:
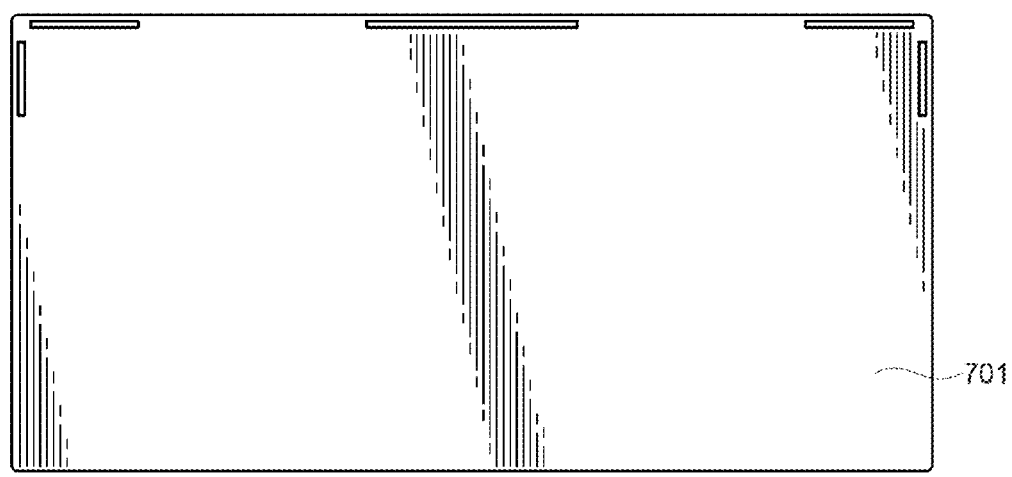
FIG. 45: A bottom view of a video observation apparatus in an assembled state in accordance with the sixth embodiment.
Figure 46:
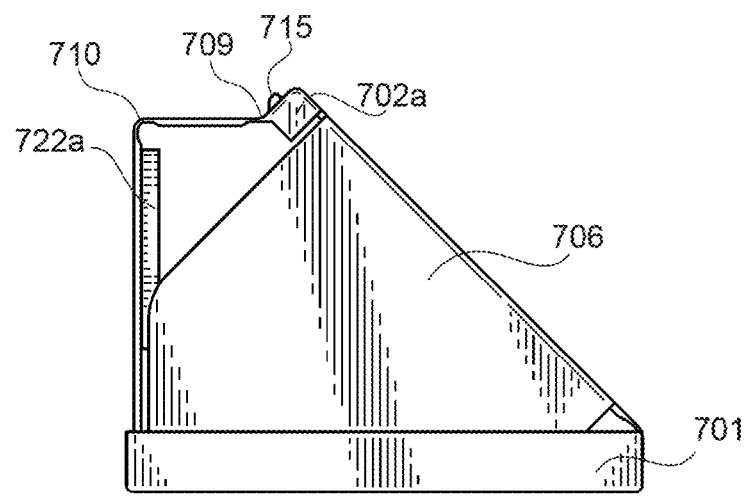
FIG. 46: A right side view of a video observation apparatus in an assembled state in accordance with the sixth embodiment.
Figure 47:
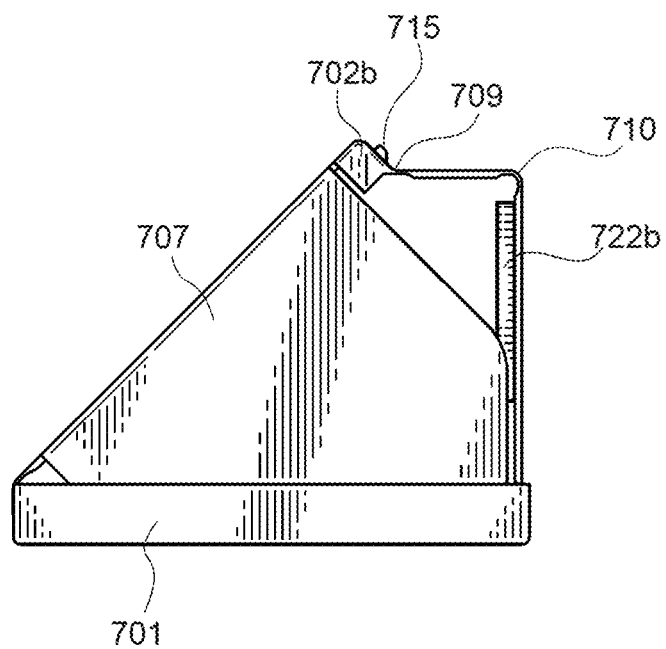
FIG. 47: A left side view of a video observation apparatus in an assembled state in accordance with the sixth embodiment.

When the cover case 60 with this sort of configuration is assembled, it creates an interior space that is essentially a pentagonal column shape disposed so that, as shown in FIG. 43, the bottom sheet 605 and the top sheet 602 face one another, and the right-side sheet 604 and the left-side sheet 606 face one another. When assembling, an adhesive member such as Magic Tape (registered trademark) or double-sided tape, for example, which has been provided at a locking piece 601a that protrudes from the edge of the lens sheet 601 is adhered to the surface of the right-side sheet 606, thereby maintaining the three-dimensional shape as shown in FIG. 43. When the cover case 60 is assembled, the lens sheet 601 is erected perpendicular to the surface of the display unit 13a of the information processing terminal 10, and the mirror sheet 603 is slanted at an angle of essentially 45° in relation to the surface of the display unit 13a. It should be noted that the angle between the mirror sheet 603 and the lens sheet 601 is not restricted as long as an image displayed at the display unit 13a is reflected by the mirror unit 29 and enters the lens unit 21 and the viewer can observe stereo video well.

In this sort of configuration, with the information processing terminal 10 housed in the interior, when stereo video is displayed at the display unit 13a, as shown in FIG. 38, light emitted from the display unit 13a is incident toward the mirror sheet 603, is reflected at the reflective face 29a of the mirror unit 29, and exits toward the side of the pair of lens units 21 and 21. Then the respective right-eye image and left-eye image become incident at the pair of lens units 21 and 21, and stereo video can be viewed at viewer eye EY. In this sort of embodiment, a user who has difficulty seeing near things well, as in the case of elderly eyes or the focus freeze phenomenon, can perform adjusting exercises (stretches) for various eye muscles, and can easily adjust focus.

In addition, the cover case 60 also has the function of being an ordinary cover case. When not viewing stereo video, as shown in FIG. 39, it is folded so that the lens sheet 601 and the mirror sheet 603 overlap with the top sheet 602 interposed, and folded so that the lens sheet 601 and the top sheet 602 are sandwiched between the mirror sheet 603 and the information processing terminal 10. This protects the information processing terminal 10, and the lens units 21 and 21 and the mirror unit 29 are positioned at the inside of the sheets, so it is possible to prevent the lenses and mirror, etc. from cracking if subjected to an external shock.

Sixth Embodiment

Next, a sixth embodiment of the present invention shall be described with reference to FIGS. 40-53. It should be noted that in the following embodiments and modifications, constituent elements that are the same as in the previously described embodiments are assigned the same codes, and their functions are the same, unless specially noted, so discussion thereof shall be omitted.

Figure 40:
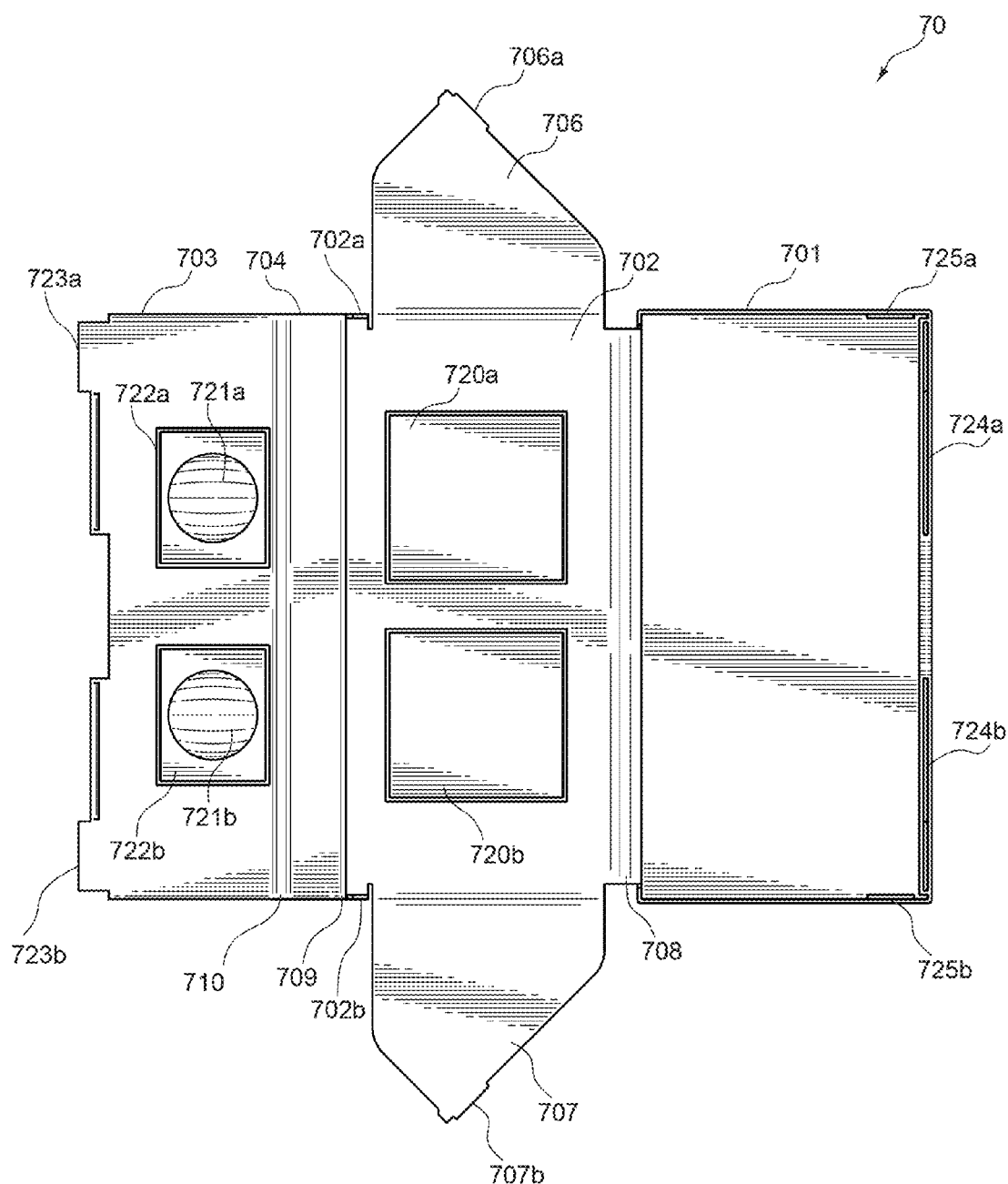
FIG. 40: An exploded view of a video observation apparatus in accordance with the sixth embodiment.

FIG. 40 is an exploded view of a collapsible video observation apparatus 70 in accordance with the present embodiment. As is clear from the drawing, the collapsible video observation apparatus 70 accordance with the present embodiment has a shape with left/right symmetry that corresponds to observing an information processing terminal housed inside the video observation apparatus with the left and right eyes. The video observation apparatus 70 comprises a boxlike bottom face 701, a back sheet 702 that is linked to the bottom face 701 with a back crease 708 interposed, a right-side sheet 706 and a left-side sheet 707 that are respectively linked to the left and right sides of the back sheet 702, a top sheet 704 that is linked to the back sheet 702 with an upper crease 709 interposed, and a front sheet 703 that is linked to the top sheet 704 with a front crease 710 interposed, integrally formed from a single sheet of a material such as plastic, cloth, or paper.

More precisely, the bottom face 701 has a boxlike shape with a size suitable for housing an information processing terminal. Provided at its edges are a pair of front locking pieces 724a and 724b and a pair of side locking pieces 725a and 725b which are used for locking when the case is assembled. Also, the back sheet 702 is provided with a pair of mirror units 720a and 720b which face the bottom face when assembled, and with a pair of light-blocking parts 702a and 702b, at the left and right at positions equivalent to the vertex when assembled, to reduce incident light from the outside. In addition, a right-side locking part 706a and a left-side locking part 707b which are used for locking when assembled are respectively provided at the left and right side sheets 706 and 707. Also, a pair of lens fixing parts 722a and 722b for fixing the lenses to the front sheet 703 and a pair of front sheet locking parts 723a and 723b for locking when assembled are provided at the front sheet 703.

Figure 41:
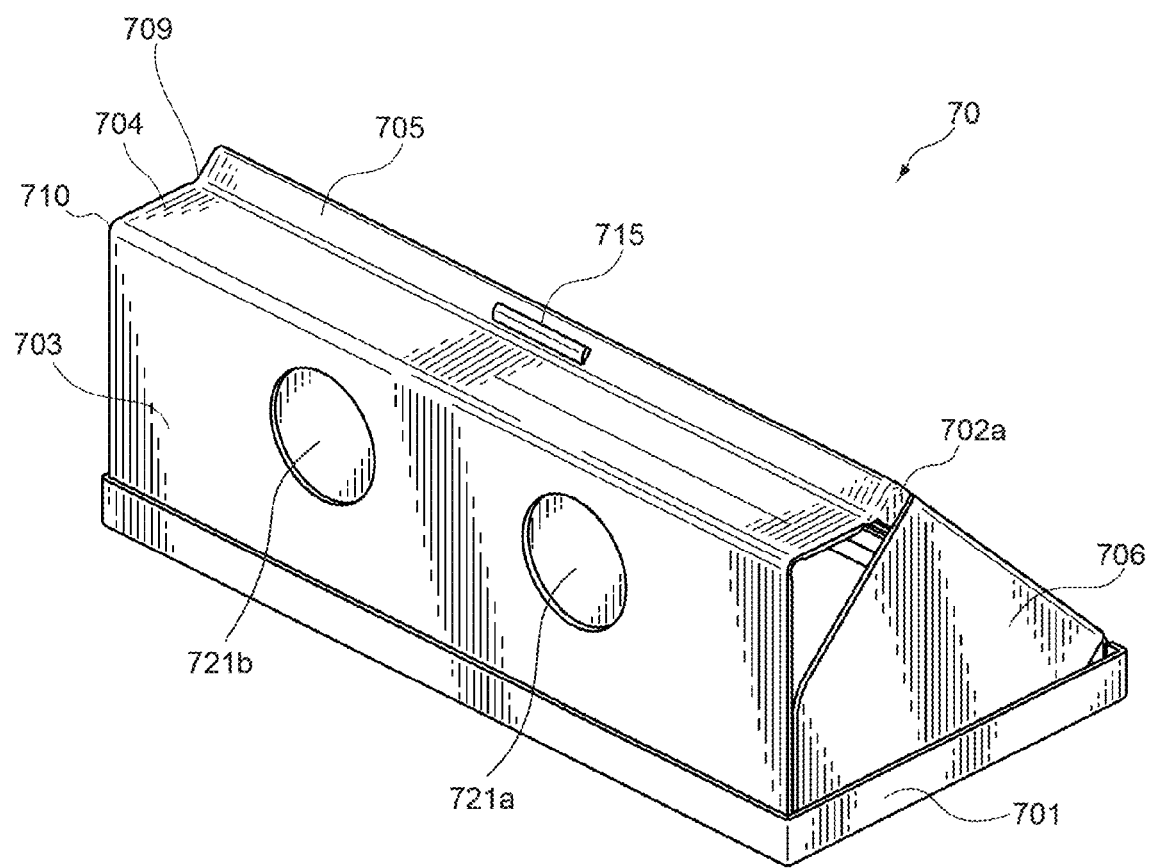
FIG. 41: An oblique view of a video observation apparatus in an assembled state in accordance with the sixth embodiment.
Figure 42:
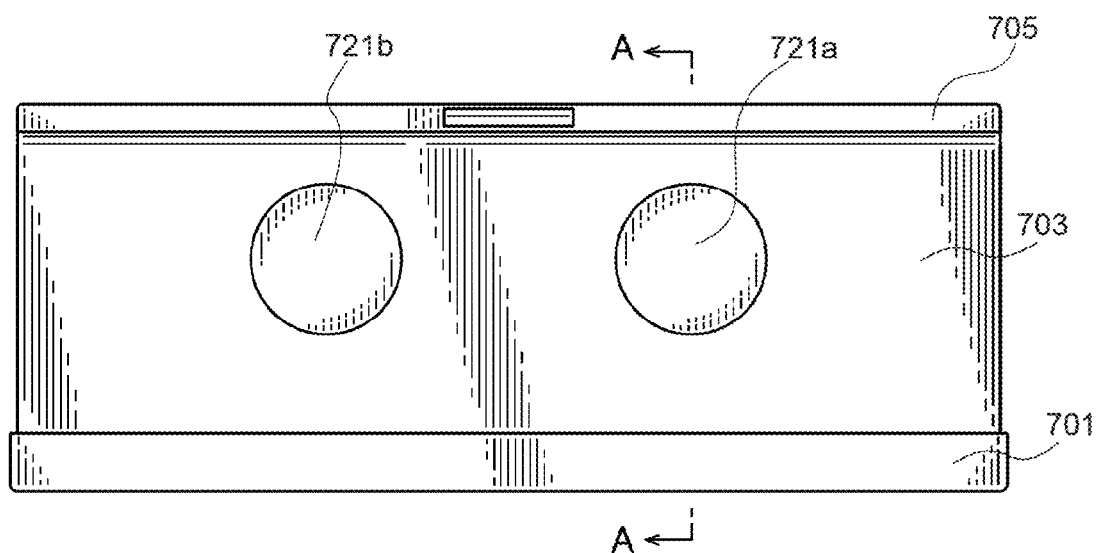
FIG. 42: A front view of a video observation apparatus in an assembled state in accordance with the sixth embodiment.
Figure 48:
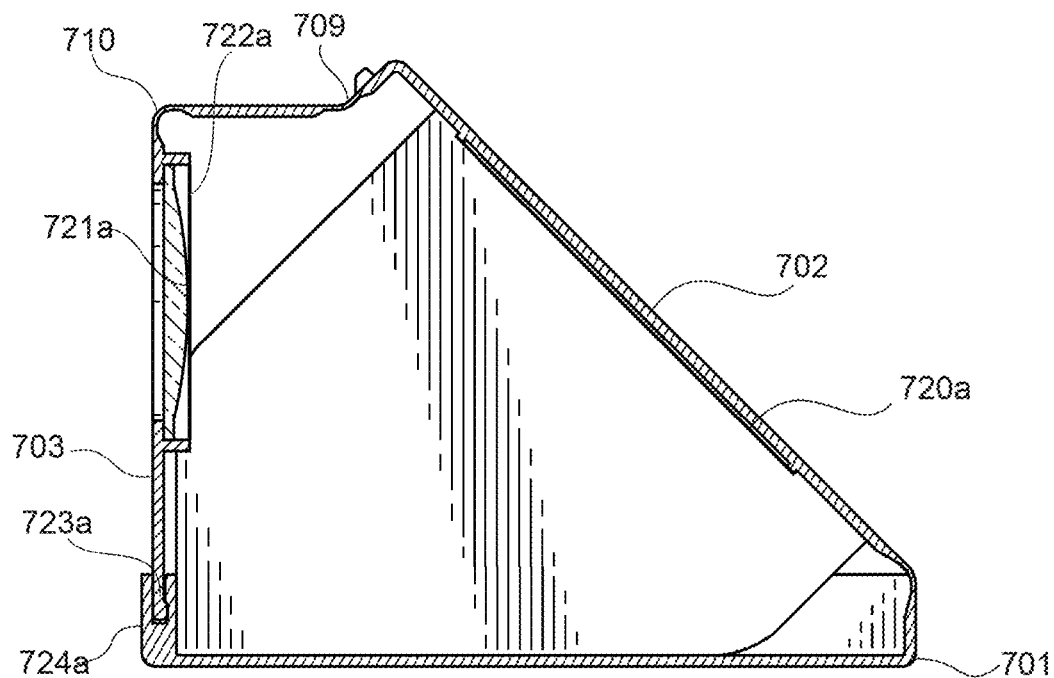
FIG. 48: A cross-section of a video observation apparatus in an assembled state at A-A in accordance with the sixth embodiment.

Next, the collapsible video observation apparatus in accordance with the present embodiment in an assembled state shall be described. FIG. 41 is an oblique view when the collapsible video observation apparatus described above in the exploded view has been assembled. FIGS. 42 to 47 are a six-sided view when the collapsible video observation apparatus described above in the exploded view has been assembled. In addition, FIG. 48 is a cross-section view in which the assembled video observation apparatus has been cut along plane A-A in FIG. 42. The assembled shape shown in the drawings is produced by bending the back crease 708 linked to one edge of the bottom face 701 so that the back sheet forms an acute angle with respect to the bottom face 701, bending the upper crease 709 so that the top sheet 704 is essentially horizontal with respect to the bottom face 701 when assembled, bending the front crease 710 linked to the front sheet so that the front sheet is essentially perpendicular with respect to the bottom face 701 when assembled, and inserting and locking the pair of front sheet locking parts 723a and 723b and the pair of right-side locking part 706a and left-side locking part 707b in front locking holes 724a and 724b and 725a and 725b that are respectively provided in the bottom sheet. At this point, a back sheet wall 705 is provided on a portion on which the back sheet 702 and the top sheet 704 are linked and which is positioned between the light-blocking part 702a and the light-blocking part 702b, and the top sheet 704 is linked with the back sheet 702 through the back sheet wall 705. In other words, the top sheet 704 is offset downward from the top of the back sheet 702 by about the height of the back sheet wall 705. That is, with the above-mentioned assembled shape, when the information processing terminal is housed on the bottom face 701 with the display face aimed upward, the viewer can observe the image on the display face of the information processing terminal, the image having been reflected by the pair of mirror units 720a and 720b and arrived, from the outside, at the left and right independently, via the left and right lenses 721a and 721b of the front sheet. In particular, in a case in which a left-eye image and a right-eye image with parallax are displayed on the display face of the information processing terminal at positions corresponding to the lenses, the viewer can observe a three-dimensional image.

As described above, in the video observation apparatus 70 in the present embodiment in an assembled state, the top sheet 704 is linked with the back sheet 702 through the back sheet wall 705, and the top sheet 704 is offset downward from the top of the back sheet 702 by about the height of the back sheet wall 705. Therefore, a linking portion between the top sheet 704 and the back sheet 702 is reinforced, and the shape thereof is not easily crushed when it is grasped. As a result, it is not necessary to select high-rigidity materials, the degree of freedom with regard to materials increases, and it is possible to reduce manufacturing costs.

As described above, in the assembled collapsible video observation apparatus 70 in accordance with the present embodiment, the top sheet 704 and the bottom face 701 are disposed essentially horizontally at the front of the video observation apparatus, and the back sheet 702 linked to the bottom face 701 is slanted at an acute angle with respect to the bottom face 701 at the back of the video observation apparatus. With this sort of video observation apparatus, a viewer who is observing the display image of an information processing terminal using this collapsible video observation apparatus 70 holds the bottom face 701 with his or her thumbs, holds the top sheet 704 with his or her index fingers and/or middle fingers, and can fit the remaining fingers to the slanted face of the back sheet 702 and grip it. Therefore, according to the collapsible video observation apparatus 70 of the present embodiment, gripping in an all-encompassing manner is possible, so stabilized gripping becomes possible, and the feeling of fatigue in the hands is reduced, and it is suitable for long-duration use, etc.

Also, the top sheet 704 is supported mainly by the front sheet 703, which is locked to the bottom face 701 via the front locking holes 724a and 724b, the back sheet 702 is supported by the right-side sheet 706 and the left-side sheet 707, and the right-side sheet 706 is locked to the bottom face 701 via the right-side locking part 706a and the left-side sheet 707 is locked to the bottom face 701 via the left-side locking part 707b. That is, the top sheet 704 is supported mainly by the front sheet 703 and is self-sustaining, while the back sheet 702 is supported mainly by the right-side sheet 706 and the left-side sheet 707 and is self-sustaining. Therefore, according to the collapsible video observation apparatus 70 of the present embodiment, even in a situation in which the bottom face 701 is held with the thumbs, the top sheet 704 is held with the index fingers and/or middle fingers, and the remaining fingers are fitted to the slanted face of the back sheet 702 and the video observation apparatus is gripped in an all-encompassing manner, the gripping load is distributed to the front of the video observation apparatus where the index fingers and/or middle fingers are placed and the back of the video observation apparatus where the remaining fingers are placed, so the gripping load is dispersed over the entire video observation apparatus, and the shape thereof is not easily crushed. As a result, it is not necessary to select high-rigidity materials, the degree of freedom with regard to materials increases, and it is possible to reduce manufacturing costs.

In addition, in the collapsible video observation apparatus 70 in accordance with the present embodiment, when assembled, the sheet 702 is supported by the right-side sheet 706 and the left-side sheet 707, and the right-side sheet 706 is locked to the bottom face 701 via the right-side locking part 706a and the left-side sheet 707 is locked via the left-side locking part 707b. That is, the back sheet 702 is self-sustaining via the right-side sheet 706 and the left-side sheet 707. Also, the upper sheet 704 and the front sheet 703 are linked to the back sheet 702 in an openable/closable manner via the upper crease 709. Therefore, the viewer who is using the collapsible video observation apparatus 70 in accordance with the present embodiment can open or close just the top sheet 704 and the front sheet 703 that are at the front, without opening the self-sustaining back sheet 702. As a result, it becomes easy to operate the information processing terminal by inserting or removing the information processing terminal temporarily, or by touching the display screen.

In addition, the collapsible video observation apparatus 70 in accordance with the present embodiment has the right-side sheet 706, the left-side sheet 707, and left and right light-blocking parts 702a and 702b. Therefore, the viewer observing the information processing terminal housed inside the collapsible video observation apparatus 70 can observe with the effect of outside light minimized. Also, as will be described later, the right-side sheet 706 and the left-side sheet 707 are collapsible, and the light-blocking parts 702a and 702b and the back sheet wall 705 also do not exceed the height of the bottom face 701 when collapsed. Therefore, the collapsible video observation apparatus in accordance with the present embodiment is very small in size when folded up, and is easy to carry around.

Figure 49:
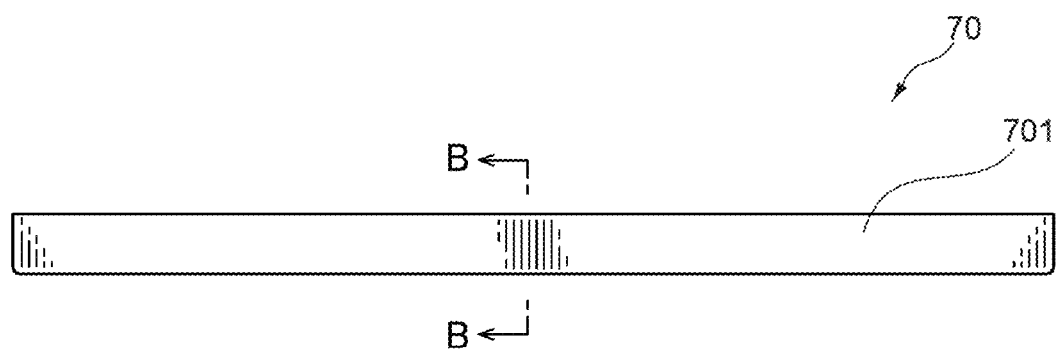
FIG. 49: A front view of a video observation apparatus in a collapsed state in accordance with the sixth embodiment.
Figure 50:
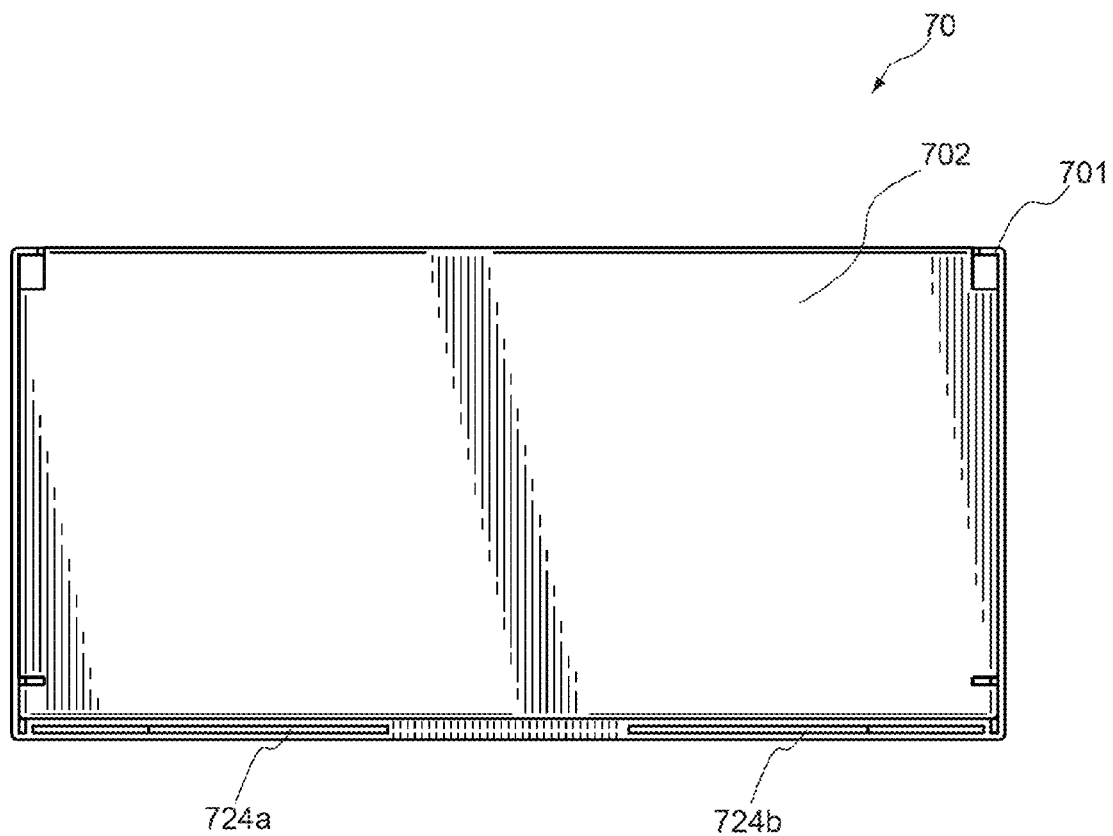
FIG. 50: A plain view of a video observation apparatus in a collapsed state in accordance with the sixth embodiment.
Figure 51:
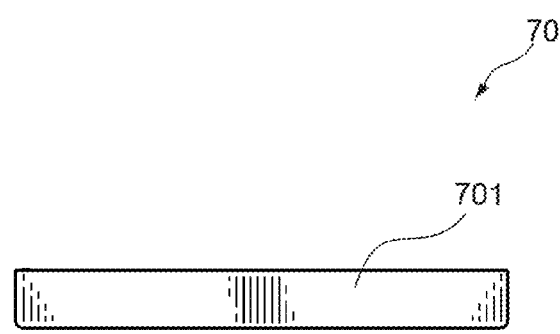
FIG. 51: A right side view of a video observation apparatus in a collapsed state in accordance with the sixth embodiment.
Figure 52:
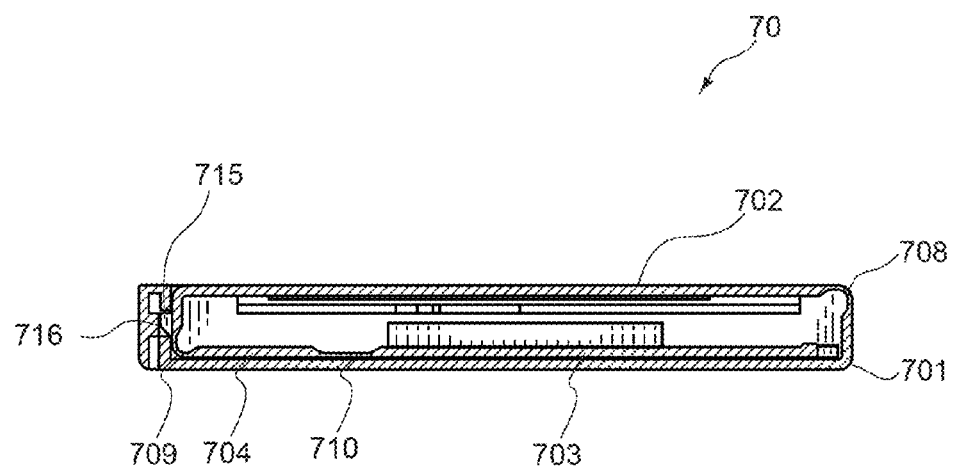
FIG. 52: A cross-section of a video observation apparatus in a collapsed state at B-B in accordance with the sixth embodiment.

Next, the collapsible video observation apparatus in accordance with the present embodiment when collapsed shall be described. FIGS. 49 to 51 are a six-sided view showing a collapsible video observation apparatus in accordance with the present embodiment when collapsed. FIG. 52 is a cross-section view of a collapsed video observation apparatus at cross-section B-B. It should be noted that in the six-sided view the left-side view, back view, and bottom view are evident, and so are omitted here. As is clear from the drawings, the back sheet 702, top sheet 704, and front sheet 703 are collapsed by bending the top crease 709 and the front crease 710, and are housed within the bottom face 701 without exceeding the height of the wall of the edges of the bottom face 701. When housed, the video observation apparatus 70 is kept in a closed state by engagement between a protruding part 715 provided at the back sheet 702 and a protruding locking part 716 provided at the bottom face 701.

That is, in the collapsible video observation apparatus 70 in accordance with the present embodiment the back sheet 702, top sheet 704, and front sheet 703 can be collapsed and housed inside the bottom face 701, and their height when folded does not exceed the height of the bottom face 701, and the shape when collapsed is a thin rectangular body. Therefore, the collapsible video observation apparatus 70 in accordance with the present embodiment is very small in size when folded up, and is easy to carry around.

Figure 53:
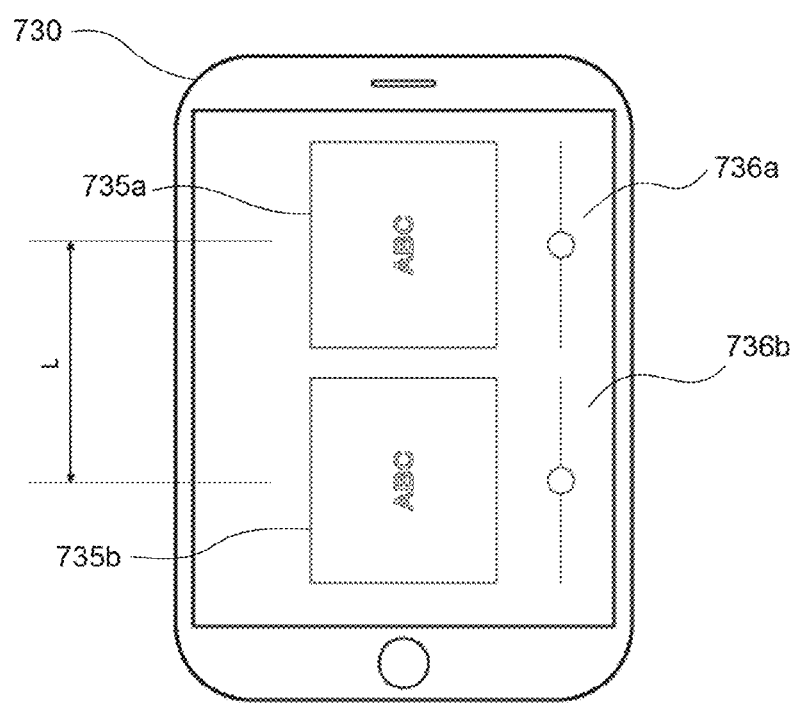
FIG. 53: A diagram for showing a display arrangement at the display unit of an information processing terminal in accordance with the sixth embodiment

Next, the application program executed by the application execution unit 141 in the present embodiment shall be described while referring to FIG. 53. It should be noted that the application program in accordance with the present embodiment differs from those in other embodiments by having an inter-pupil distance regulation function as shown in FIG. 5.

When the viewer operates an information processing terminal 730, a program for three-dimensional image observation is read from the memory 15 by the application execution unit 141, and a right-eye image 735*a* and a left-eye image 735*b* are displayed on the screen as shown in FIG. 53. There is parallax between the right-eye image 735*a* and left-eye image 735*b*, so if the viewer were to observe these images without the pair of lenses 721*a* and 721*b*, the images would appear as a three-dimensional image to the viewer.

Also, a right-eye distance regulation slide bar 736*a* and a left-eye distance regulation slide bar 736*b* are displayed on the display screen of the information processing terminal 730. When the viewer operates the right-eye distance regulation slide bar 736*a* to the left or right, the right-eye image 735*a* moves left or right in accordance with that sliding operation, and when the viewer operates the left-eye distance regulation slide bar 736*b* to the left or right, the left-eye image 735*b* moves left or right in accordance with that sliding operation. That is, by operating the right-eye distance regulation slide bar 736*a* and the left-eye distance regulation slide bar 736*b*, the distance between the right-eye image 735*a* and the left-eye image 735*b* is generated and input into the application execution unit 141 by the pupil distance input unit 144 shown in FIG. 5 and it is possible to regulate the distance L between the right-eye image 735*a* and the left-eye image 735*b*. At this point, the pair of mirror units 720*a* and 720*b* is arranged so as to cover the display area of the right-eye video 735*a* and the left-eye video 735*b*.

Now, the distance between a person's pupils changes in accordance with the growth of the person, and varies according to race and sex. For example, the inter-pupil distance of a child of elementary school age is about 56 mm to 59 mm on the average, whereas the average for inter-pupil distance in adults is about 62 mm to 66 mm. Therefore, if the left and right images are not placed at appropriate positions, for example if distance L between the left and right images does not properly correspond to the inter-pupil distance of the viewer, there are problems: crosstalk occurs between the left and right images, the sense of depth is diminished, and the three-dimensional image cannot be properly recognized.

However, according to the present embodiment it is possible to place the left and right images at positions corresponding to the inter-pupil distance of the viewer by operating the slide bars, so the images can be observed with the left/right separation that is optimal for the viewer, the degree of independence between the images is further increased, and it is possible to observe an even higher-quality three-dimensional image. Also, since the degree of independence between the left and right images is increased in this manner, features such as a partition plate for preventing crosstalk between the left and right images inside the device are not required. Therefore, it is possible to make the device be small, and it is possible to reduce manufacturing costs.

Also, as described above, the collapsible video observation apparatus 70 in accordance with the present embodiment when housing the above-mentioned information processing terminal can open or close only the top sheet 704 and the front sheet 703 that are present at the front, and it is possible to touch and operate the display screen of the information processing terminal by opening only that front part. Therefore, operations such as regulating the distance between the left and right images can be performed easily in accordance with the present embodiment.

In addition, it is possible to configure matters so that simultaneously with regulating the distance between the left and right images it is also possible to adjust the display size, focal length, lens magnification, etc. In this case, the degree of independence between the left and right images is additionally increased, and it is possible to provide even higher-quality three-dimensional images. Also, since the degree of independence between the left and right images is increased in this manner, features such as a partition plate for preventing crosstalk between the left and right images inside the device are not required. Therefore, it is possible to make the device be small, and it is possible to reduce manufacturing costs.

It should be noted that the present embodiment is configured to operate the left and right images by operating left and right slide bars, but alternative configurations are also possible, as long as it is possible to regulate the distance between the two images; therefore, the present invention is not limited to the configuration described above. For example, operation of one slide bar may be linked to the other's distance regulation, or operating a single slide bar could adjust the distance between both images, or buttons such as "distant/middle/near" could be provided and the distance between the two images is regulated in a noncontinuous manner by operating these, or distance regulation could be performed by touching an image directly.

It should also be noted that the video observation apparatus may include all the devices through that an observer can observe images, movies or videos displayed on an information processing terminal. Therefore, for example, a cover case for a smartphone is included in the video observation apparatus.

Modifications

It should be noted that the descriptions of each embodiment shown above are one example of the present invention. Therefore, the present invention is not limited to the embodiments described above, and of course it is possible to make various changes in accordance with design, etc. and to combine the respective configurations, without departing from the scope of the technical concept of the present invention. It should also be noted that in the following modifications, constituent elements that are the same as in the previously described embodiments are assigned the same codes, and their functions are the same, unless specially noted, so discussion thereof shall be omitted.

Modification 1

Next, Modification 1 shall be described. The previously described embodiments used lenses such that the right-eye lens matched only the focal point of the right-eye image and the left-eye lens matched only the focal point of the left-eye image, but the present invention is not limited to this. In another configuration of the lens units 21 and 21, the right-eye video forms an image only at the right eye and the left-eye video forms an image only at the left eye.

For example, it is possible to use an electronic shutter lens which alternatingly displays left-eye video and right-eye video, and which is provided with a shutter control mechanism that opens or closes shutters provided at the left and right lenses in sync with the alternating display. In this case, the lens units 21 and 21 are each provided with an electronic shutter drive unit for driving the shutter, and the electronic shutter drive units and the information processing terminal 10 are connected by a cable, etc. Also, the application execution unit 141 of the information processing terminal 10 alternatingly displays left-eye video and right-eye video, and transmits synchronization signals to synchronize with the alternating display to the electronic shutter drive units. As a result, by opening and closing the shutters provided at the left and right lenses, the left-eye video on the screen of the display unit 13*a* is allowed to pass in the direction of the left eye of the viewer and the right-eye video is allowed to pass in the direction of the right eye of the viewer, alternatingly, and the viewer can recognize stereo video.

Figure 33A:
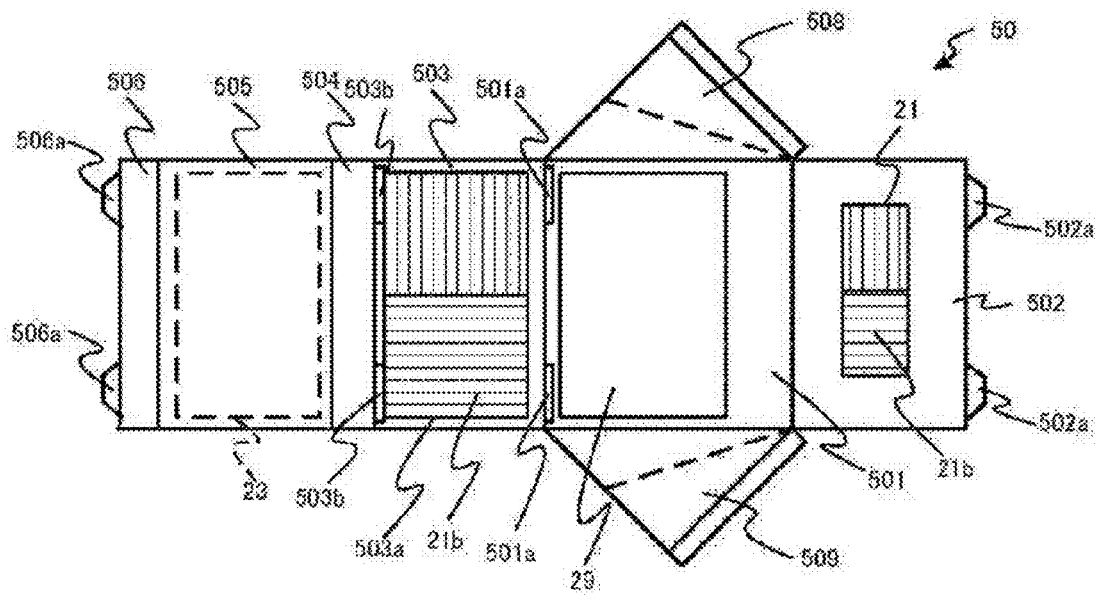
FIG. 33A: An exploded view of a cover case showing polarization sheets glued to the lens unit in accordance with a modification.
Figure 33B:
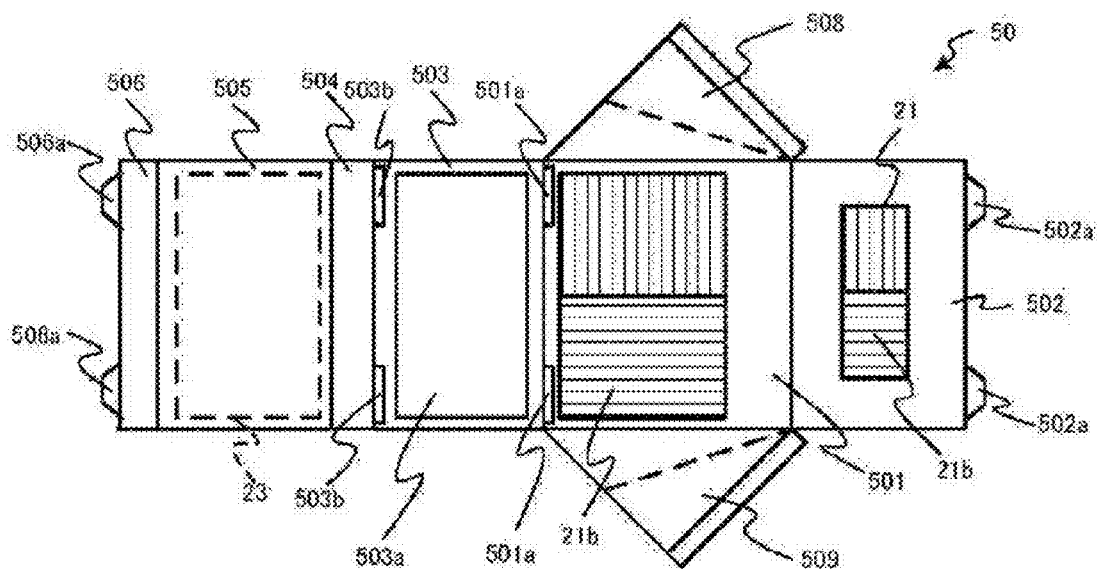
FIG. 33B: An exploded view of a cover case showing polarization sheets glued to the lens unit in accordance with a modification.

Also, when using a Fresnel lens as the lens unit 21, as in the case of the fourth embodiment and the fifth embodiment, a polarization filter may also be glued on. Specifically, as shown in FIG. 33A, a polarization filter 21*b* is glued to the lens unit 21 and the opening portion 503*a* of the top sheet 503 where the display unit 13*a* is positioned. When doing so, two types of sheets are used, for the right eye and the left eye: a polarization sheet that transmits only longitudinally polarized light, and a polarization sheet that transmits only transversely polarized light. In this case, the right-eye video forms an image only at the right eye and the left-eye video forms an image only at the left eye, so it is possible to better observe stereo video more reliably. It should be noted that the location for gluing the polarization sheets is not limited to the lens unit 21 and the opening portion 503*a*; for example, as shown in FIG. 33B, the polarization sheets 21*b* may be glued to the surfaces of the lens unit 21 and the mirror unit 29.

Modification 2

Figure 21A:
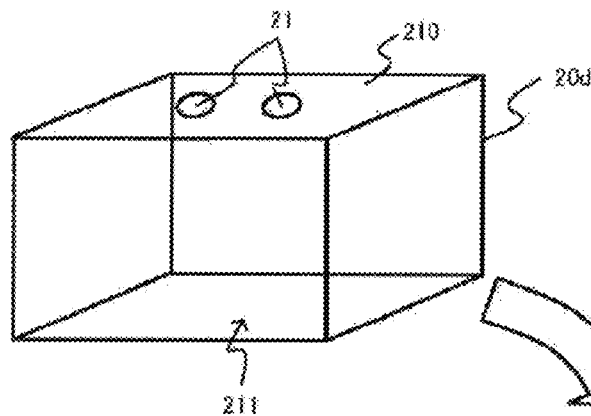
FIG. 21A: An oblique view showing a casing in accordance with a modification.
Figure 21B:
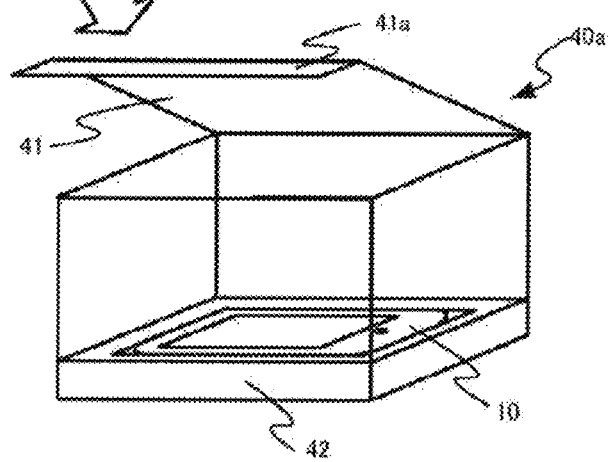
FIG. 21B: An oblique view showing a packing member that packages an information processing terminal in accordance with a modification
Figure 21C:
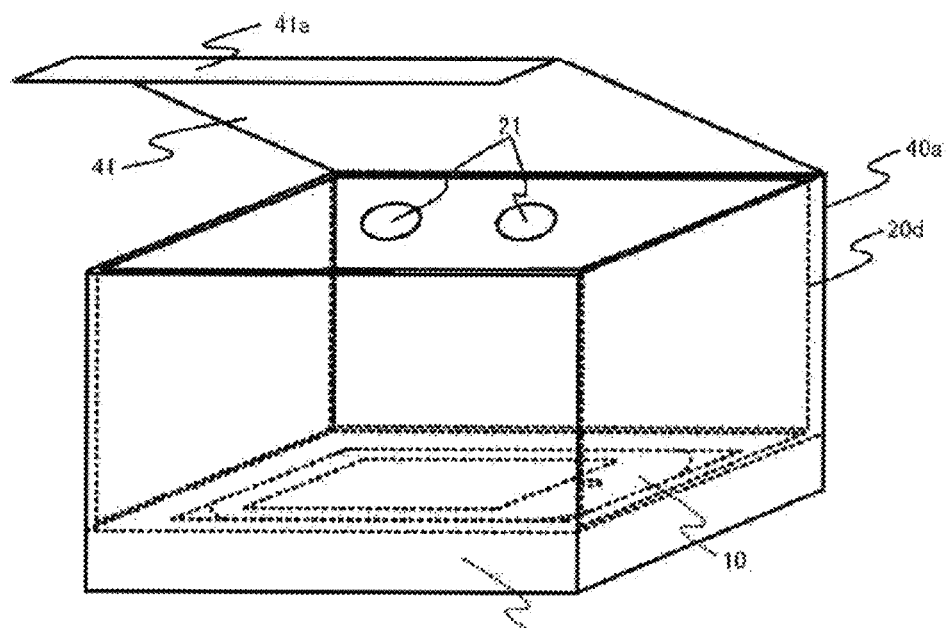
FIG. 21C: An oblique view showing a casing in accordance with a modification accommodated inside the packing member.
Figure 22A:
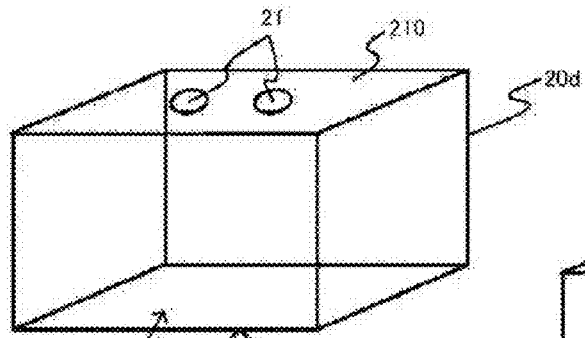
FIG. 22A: An oblique view showing a casing in accordance with a modification
Figure 22B:
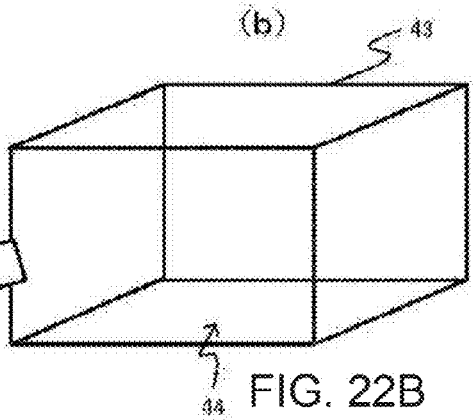
FIG. 22B: An oblique view showing the upper case of a packing member that packages an information processing terminal in accordance with a modification
Figure 22C:
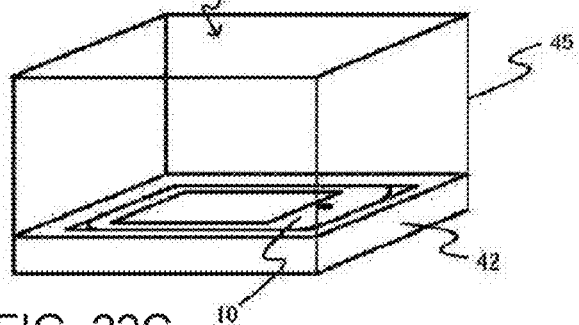
FIG. 22C: An oblique view showing the lower case of a pack packing member that packages an information processing terminal in accordance with a modification
Figure 22D:
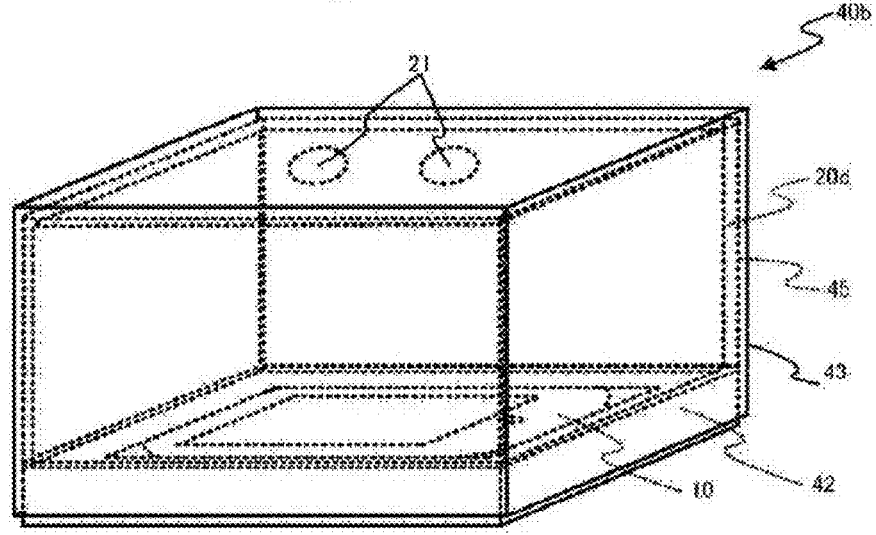
FIG. 22D: An oblique view showing a casing in accordance with a modification accommodated inside the packing member.

Next, Modification 2 shall be described. This modification summarizes a case in which stereo video can be observed using the packing member that packages the stereo information terminal 10. FIG. 21A is an oblique view showing a casing in accordance with this modification, FIG. 21B is an oblique view showing a packing member that packages an information processing terminal in accordance with this modification, and FIG. 21C is an oblique view showing a casing in accordance with this modification accommodated inside the packing member. Also, FIG. 22A is an oblique view showing a casing in accordance with this modification, FIG. 22B is an oblique view showing the upper case of a packing member that packages an information processing terminal in accordance with this modification, FIG. 22C is an oblique view showing the lower case of a pack packing member that packages an information processing terminal in accordance with this modification, and FIG. 22D is an oblique view showing a casing in accordance with this modification accommodated inside the packing member.

The packing member used when shipping the information processing terminal 10 is, for example, as shown in FIG. 21B, formed in an integrated manner by cutting from a single sheet of a material such as paper or plastic; bending produces an essentially rectangular oblong packing member 40*a*. In this sort of packing member 40*a* the top sheet 41 is an upper lid, and the information processing terminal 10 can be inserted or removed by opening the top sheet 41. Also, a holding unit 42 for holding the information processing terminal 10 is provided in the interior of the packing member 40*a*. The holding unit 42 is a member which holds the side faces of the information processing terminal 10; it may be the holding unit 30 seen in the third embodiment, or the holding unit 24*a* seen in the fifth embodiment, or may have another configuration. The holding unit differs according to the different manufacturers who manufacture the packing member.

Meanwhile, a casing 20*d* is formed from a material such as paper or plastic, and as shown in FIG. 21A, is formed from a top sheet 210, where a pair of lens units 21 and 21 are formed, and four side face sheets which are linked to the four sides of the top sheet 210 with creases interposed. Also, the casing 20*d* has an opening 211 at the side opposite the top sheet 210, and the interior thereof is hollow; the size of the casing 20*d* is a size which enables it to be housed in the packing member 40*a*. It should be noted that the position of the pair of lens units 21 and 21 formed in the top sheet 210 is set to correspond to the holding unit 42 of each different manufacturer, and so that the distance between the center portion of the display unit 13*a* and the lens units 21 is the same.

Also, as shown in FIGS. 21A and 21B, when the information processing terminal 10 is shipped, first, the casing 20*d*, holding the information processing terminal 10 with the holding unit 42, is housed in the interior [of the packing member 40*a*], and then an insertion part 41*a* formed at the front edge of the top sheet 41 is inserted into the casing 20*d*, and [the assembly] is shipped. Meanwhile, when observing stereo video, as shown in FIG. 21C, the information processing terminal 10 is disposed at the holding unit 42, and then the casing 20*d* is housed inside the packing member 40*a*, and the top sheet 41 is opened. In this state, the viewer can observe stereo video through the pair of lens units 21 and 21.

It should also be noted that this sort of simplified casing 20*d* may be used in a packing member that takes another shape. For example, as shown in FIGS. 22C and 22D, it can be used in a packing member 40*b* created by fitting together an upper case 43, with an opening 44 at the bottom, as shown in FIG. 22A, and a lower case 45, with an opening 46 at the top, as shown in FIG. 22B.

This packing member 40*b* also has a holding member 42 that holds the information processing terminal 10 at the bottom portion of the lower case 45. Also, when shipping, as shown in FIG. 22A-22C, first, the information processing terminal 10 is disposed on the holding unit 42, and then the casing 20*d* is housed in the interior of the lower case 45. Subsequently, the upper case 43 is fitted and inserted so as to cover the lower case 45, and [the assembly] is shipped. Meanwhile, when observing stereo video, as shown in FIG. 22D, the information processing terminal 10 is disposed at the holding unit 42, and then the casing 20d is housed in the lower case 45. In this state, the viewer can observe stereo video through the pair of lens units 21 and 21.

As a result of this sort of modification, the kit for observing stereo video can be packaged together with the packing members 40a and 40b in which the information processing terminal is packed. Therefore, it is possible to reduce the number of components and to further lower the manufacturing cost, and to provide opportunities for observing stereo video to many more users.

Modification 3

Figure 24:
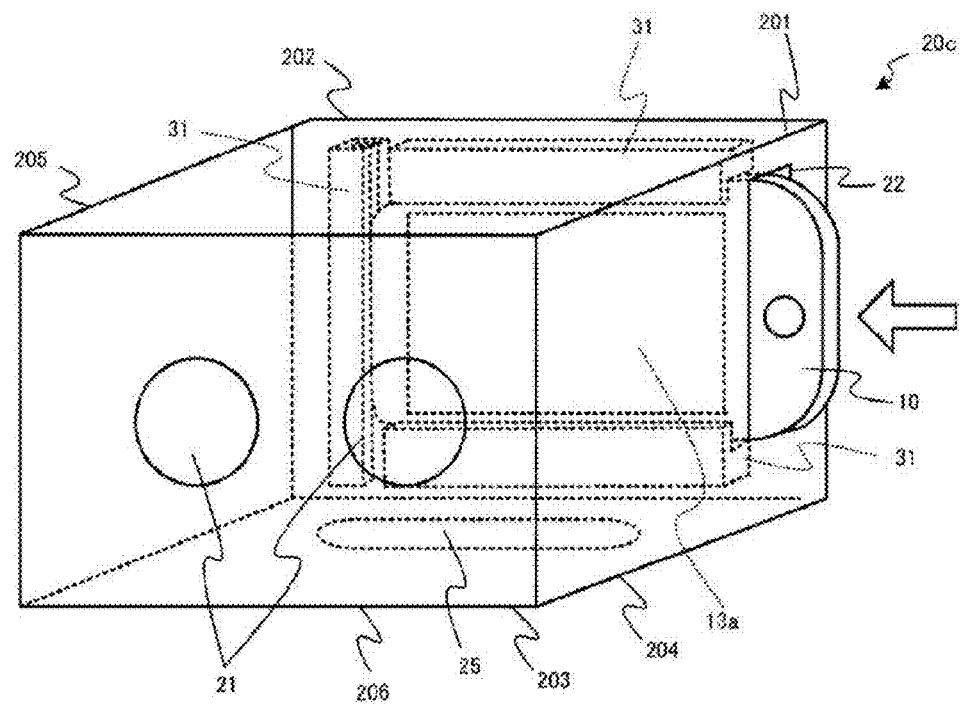
FIG. 24: An oblique view showing an information processing terminal in accordance with a modification disposed in a casing.

In the embodiments described above the entire information processing terminal 10 was housed in the interior of the casing 20c, but as shown in FIG. 24, for example, it is also possible to configure matters so that part of the terminal is disposed at the outside. In this case, if the speaker portion, for example, extends to the outside, it is possible to prevent sound from being confined inside. Also, if the information processing terminal 10 is a device that is operated by buttons, etc., the operation device can be disposed at the outside, and so is easy to operate.

Also, in the third embodiment described above, the holding unit 30 formed convex parts 304 by bending the pair of side holding pieces 303 and 303 and the pair of vertical holding sides 302 and 302, but as shown in FIG. 25A, is also possible to hold the information processing terminal 10 by using a holding unit 31 formed by flexible members made of sponge or urethane, etc.

The holding unit 31 in this modification, as shown in FIG. 25A, is a holding member which holds the information processing terminal from three directions—other than the insertion direction—when the information processing terminal 10 is inserted from the opening 22. In this embodiment, the holding unit 31, as shown in FIG. 25C, has an cross-section shape that is essentially a [ shape, and holds the information processing terminal in this gap when it is fitted into the gap.

Also, the holding unit 31, as shown in FIG. 25B, has an adhesive member 32 such as double-sided tape on the back face. The holding unit 31 is fixed with respect to the stage unit 23b by being glued to the back sheet 201 using the adhesive member 32. Here, marks 201c are put on the surface of the stage unit 23b, as shown in FIG. 26A, at the locations for gluing the holding unit 31 so that the information processing terminal 10 is disposed at the appropriate position. It should be noted that a plurality of these marks 201c are made on the basis of the sizes of the information processing terminals 10 of different companies.

Thus, in this embodiment the holding unit 31 is fixed to the stage unit 23b by gluing, and when the information processing terminal 10 is slid in from the opening 22, the information processing terminal 10 is housed in the gaps of the holding unit 31 as shown in FIG. 26B. As a result, the screen side of the information processing terminal 10 is also pressed, so even if the casing 20 is tilted it is possible to prevent positional displacement of the information processing terminal 10. Also, in this modification the holding member 31 is formed as a flexible member of sponge or urethane, etc., so the holding unit 31 can deform to match the shape of the information processing terminal 10. As a result, when the information processing terminal 10 is housed in the holding unit, it can be held without creating gaps between the information processing terminal 10 and the holding unit 31, and positional displacement of the information processing terminal 10 can be better prevented. It should be noted that this sort of configuration can also be used for the holding units in the various embodiments and modifications described previously.

Here, as in the second embodiment, when holding the large-sized information processing terminal 10a, the holding unit 31 is glued at three locations to the surface portion of the side face sheet where the opening 22a is provided, in the information processing terminal 10a is slid into the gap in this holding unit 31. In this case, the holding unit may also be formed using a synthetic resin such as a plastic, or as a paper member.

Modification 4

Also, in the first embodiment described above the casing was cut into two parts, and the focal length was adjusted using a slideable linking part 28a, but it is also possible to adjust the focal length by making the holding unit that holds the information processing terminal 10 be slideable inside the casing 20c.

Figure 27:
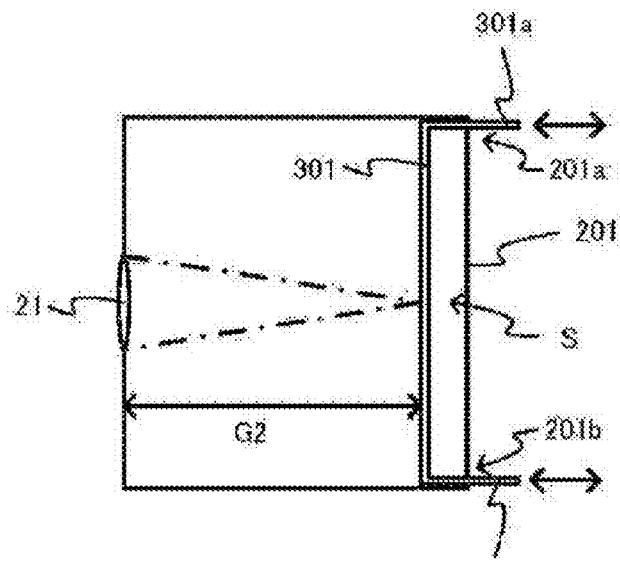
FIG. 27: An explanatory diagram showing a focal length adjustment mechanism in accordance with a modification.

The casing 20c and the holding unit 32 described in the third embodiment can be used as an example of this configuration for adjusting the focal length. Specifically, as shown in FIG. 18, locking holes 201a and 201b are provided in the back sheet 201 that serves as the stage unit in the casing 20c, and as shown in FIG. 19, insertion pieces 301a and 301a are provided in the bottom sheet 301 in the holding unit 30. Then, as shown in FIG. 27, the pair of insertion pieces 301a and 301a are inserted in the locking holes 201a and 201b, the pair of insertion pieces 301a and 301a is slid, and the distance G2 between the holding unit 30 and the lens unit 21 is changed.

Then, at the location where things are in focus, the insertion pieces 301a and 301a are bent and brought into contact with the back sheet 201, and subsequently the insertion pieces 301a are glued to the back sheet 201 and fixed using adhesive tape, etc. It should be noted that when doing so, marks may be made on the surface of the insertion pieces 301a to correspond to the information processing terminals 10 of different manufacturers. In this case, the screen size of the information processing terminal 10 is determined for each terminal, and the focal length too is determined by the screen size, so it is possible to easily adjust the focal length by moving the holding unit 30 on the basis of the marks made on the insertion pieces 301a.

It should be noted that another means for fixing the holding unit 30 to the casing 20c is to dispose and fix a fixing member such as a sponge in the interior of a space S formed between the back sheet 201 and the bottom sheet of the holding unit 30. In this case, just by disposing the fixing member in the interior it is possible to adjust the focal length, and the holding unit 30 is supported by the fixing member, so it is possible to prevent positional displacement of the information processing terminal 10.

Also, when doing so, a plurality of fixing members may be prepared with different thicknesses to correspond to the information processing terminals 10 of different manufacturers. In this case, it is possible to easily focus just by disposing the fixing member corresponding to the information processing terminal 10 that one owns in the interior. Also, when adjusting the focal length, it is possible to fix the fixing member either by a fixing means that uses adhesive tape or a fixing means that disposes a fixing material, etc., or to fix the holding unit by combining two fixing means.

The arrangements described above should be understood as being only two or three examples among a number of specific arrangements that illustrates applications of the basic principle of the present invention. A person of ordinary skill in the art could easily conceive of many other configurations without departing from the spirit and scope of the present invention.

What is claimed is:

1. A video observation apparatus for observing video displayed on the display unit of an information processing terminal, comprising:
   a bottom portion on which the information processing terminal is placed;
   a back sheet linked to one end of the bottom portion, and having a mirror portion on an inner surface of the back sheet opposing the information processing terminal, and arranged toward an observer to make an acute angle between the bottom portion and the back sheet;
   a top sheet linked to the back sheet and arranged parallel to the bottom portion; and
   a front sheet linked to the top sheet and having a lens portion positioned corresponding to the right and left eyes of the observer;
   wherein a height of the top sheet linked to the back sheet is offset downward from a height of the top of the video observation apparatus formed by the back sheet; and
   wherein the video observation apparatus is held by placing a thumb on the bottom portion, an index finger and/or a middle finger on the top sheet and the remaining fingers on the back sheet,
   further comprising:
   a back sheet wall perpendicular to the back sheet and arranged at the portion in which the back sheet is linked with the top sheet;
   wherein the top sheet is linked with the back sheet through the back sheet wall, thus the height of the top sheet linked to the back sheet is offset downward from the height of the top of the video observation apparatus formed by the back sheet,
   and further comprising:
   a pair of side sheets linked to the left and right sides of the back sheet and mainly supporting the back sheet on the bottom portion;
   wherein the front sheet mainly supports the top sheet on the bottom portion; and
   wherein the front and the top sheets and the back sheet are configured to be able to open and close independently of each other.

2. A video observation apparatus for observing video displayed on the display unit of an information processing terminal, comprising:
   a bottom portion on which the information processing terminal is placed;
   a back sheet linked to one end of the bottom portion, and having a mirror portion on an inner surface of the back sheet opposing the information processing terminal, and arranged toward an observer to make an acute angle between the bottom portion and the back sheet;
   a top sheet linked to the back sheet and arranged parallel to the bottom portion; and
   a front sheet linked to the top sheet and having a lens portion positioned corresponding to the right and left eyes of the observer;
   wherein a height of the top sheet linked to the back sheet is offset downward from a height of the top of the video observation apparatus formed by the back sheet; and
   wherein the video observation apparatus is held by placing a thumb on the bottom portion, an index finger and/or a middle finger on the top sheet and the remaining fingers on the back sheet,
   further comprising:
   a back sheet wall perpendicular to the back sheet and arranged at the portion in which the back sheet is linked with the top sheet;
   wherein the top sheet is linked with the back sheet through the back sheet wall, thus the height of the top sheet linked to the back sheet is offset downward from the height of the top of the video observation apparatus formed by the back sheet,
   and further comprising:
   a pair of side sheets linked to the left and right sides of the back sheet and mainly supporting the back sheet on the bottom portion;
   wherein the front sheet mainly supports the top sheet on the bottom portion;
   wherein the front and the top sheets and the back sheet are configured to be able to open and close independently of each other; and
   wherein the bottom portion and all the said sheets are configured as one piece and the said linking portions are configured to be able to fold such that all the sheets are stored in the bottom portion.

3. An information processing apparatus for displaying left-eye video and right-eye video created by generating a parallax therebetween on a display thereof, the display being observed through a video observation apparatus with at least lens portions corresponding to a right and left eye, comprising:
   an application execution unit for executing a program for displaying said videos; and
   a pupil distance input unit for acquiring information pertaining to a distance between the left-pupil and the right-pupil of an observer and generating video distance information between the left-eye video and the right-eye video;
   wherein the program changes a distance between the left-eye video and the right-eye video based upon the video distance information,
   and further comprising:
   a model information acquisition unit for inputting information pertaining to a type of the information processing terminal to the application execution unit;
   wherein said program changes a size, position, and aspect ratio of video displayed at said display unit on the basis of information pertaining to the type inputted from said model information acquisition unit, and changes a position of reference marks that indicate the reference position of said video; and
   wherein said program displays stereo video created by generating a convergence angle and parallax between the left-eye video and right-eye video corresponding to the left and right eyes of the viewer as said video, and changes the convergence angle and parallax of said stereo video, and thereby guides a focal point with respect to the eyes of said observer so as to approach toward or recede from said viewer,
   and further comprising:
   a speech recognition unit that recognizes speech and inputs a recognition result to said application execution unit; and
   wherein said program changes the image on the basis of said recognition result inputted from said speech recognition unit.

4. A video observation apparatus for observing an information processing apparatus for displaying left-eye video and right-eye video created by generating a parallax therebetween on a display thereof, the display being observed through a video observation apparatus with at least a lens portion each corresponding to a right and a left eye, comprising:

the information processing apparatus, including:
- an application execution unit for executing a program for displaying said videos; and
- a pupil distance input unit for acquiring information pertaining to a distance between the left-pupil and the right-pupil of an observer and generating video distance information between the left-eye video and the right-eye video; and
- wherein the program changes a distance between the left-eye video and the right-eye video based upon the acquired information pertaining to the distance, and the video observation apparatus, including:
- a bottom portion on which the information processing terminal is placed;
- a back sheet linked to one end of the bottom portion, and having a mirror portion at an inner surface of the back sheet opposite the information processing terminal, and arranged toward an observer to make an acute angle between the bottom portion and the back sheet;
- a top sheet linked to the back sheet and arranged parallel to the bottom portion; and
- a front sheet linked to the top sheet and having lens portions positioned corresponding to the right and left eyes of the observer; and
- wherein the mirror portion is arranged on an inner portion of the back sheet so as to cover areas in which the left-eye video and the right-eye video are displayed.

* * * * *